United States Patent
Jain et al.

(10) Patent No.: US 10,573,104 B2
(45) Date of Patent: Feb. 25, 2020

(54) ULTRA-WIDEBAND BASED VEHICLE ACCESS SYSTEM AND COMMUNICATION PROTOCOL FOR LOCALIZATION OF A TARGET DEVICE

(71) Applicant: Robert Bosch GmbH, Stuttgart (DE)

(72) Inventors: Vivek Jain, Sunnyvale, CA (US); Sushanta Mohan Rakshit, Santa Clara, CA (US); Martin Coors, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 42 days.

(21) Appl. No.: 16/042,397

(22) Filed: Jul. 23, 2018

(65) Prior Publication Data

US 2020/0005566 A1    Jan. 2, 2020

Related U.S. Application Data

(60) Provisional application No. 62/691,820, filed on Jun. 29, 2018.

(51) Int. Cl.
*G07C 9/00*  (2006.01)
*G01S 13/76*  (2006.01)
(Continued)

(52) U.S. Cl.
CPC ........ *G07C 9/00111* (2013.01); *G01S 13/765* (2013.01); *H04W 4/02* (2013.01); *H04L 67/12* (2013.01)

(58) Field of Classification Search
CPC ...... G07C 9/0111; G01S 13/765; H04W 4/02; B60R 25/245
See application file for complete search history.

(56) References Cited

U.S. PATENT DOCUMENTS 9,554,286 B2    1/2017   Ghabra et al.
9,679,430 B2    6/2017   O'Brien et al.
(Continued)

FOREIGN PATENT DOCUMENTS

EP         2800068 A2      11/2014
WO      2016059451 A1       4/2016
(Continued)

OTHER PUBLICATIONS

Decawave Application Note, "APS003: Real Time Location Systems," v1.00, DecaWave, 2014 (14 pages).
(Continued)

*Primary Examiner* — Nabil H Syed
(74) *Attorney, Agent, or Firm* — Maginot, Moore & Beck LLP

(57) ABSTRACT

A vehicle access system having a plurality of system nodes arranged throughout a vehicle is disclosed. The vehicle access system employs a communication protocol which utilizes two way ranging (TWR) and time distance of arrival (TDoA) localization processes to determine a position of a target portable device. The communication protocol selects the optimal combination of TWR and TDoA estimations, depending on a number of system nodes that are in communication range of the target portable device, to provide the greatest accuracy with the best power efficiency at the target portable device. Particularly, the communication protocol minimizes the number of messages sent and received by the target portable device, thereby improving the power efficiency thereof. Furthermore, the communication protocol schedules messages between the system nodes and target portable device so as to minimize the wake time of the target portable device, thereby further improving the power efficiency thereof.

20 Claims, 12 Drawing Sheets

(51) Int. Cl.
*H04W 4/02* (2018.01)
*H04L 29/08* (2006.01)

(56) References Cited

U.S. PATENT DOCUMENTS

| | | | |
|---|---|---|---|
| 9,852,560 | B2 | 12/2017 | Bauman et al. |
| 2010/0045508 | A1* | 2/2010 | Ekbal .................. G01S 13/765 342/145 |
| 2013/0143594 | A1 | 6/2013 | Ghabra et al. |
| 2014/0330449 | A1* | 11/2014 | Oman .................. G01S 13/765 701/2 |
| 2016/0059827 | A1 | 3/2016 | Uddin et al. |
| 2016/0182548 | A1 | 6/2016 | Ghabra et al. |
| 2017/0063477 | A1* | 3/2017 | Reisinger ............... H04B 17/30 |
| 2017/0106834 | A1 | 4/2017 | Williams et al. |
| 2018/0007507 | A1 | 1/2018 | Ghabra et al. |
| 2019/0304226 | A1* | 10/2019 | Golsch ............... G07C 9/00309 |

FOREIGN PATENT DOCUMENTS

| | | | |
|---|---|---|---|
| WO | 2017181050 | A1 | 10/2017 |
| WO | 2018071674 | A1 | 4/2018 |

OTHER PUBLICATIONS

Wikipedia Contributors, "Free-pace path loss," In Wikipedia, The Free Encyclopedia, updated Nov. 15, 2017, accessed Jun. 27, 2018, https://en.wikipedia.org/wiki/Free-space_path_loss (4 pages).

Decawave Application Note, "APS013: The implementation of two-way ranging with the DW1000," v1.0, DecaWave, 2014 (13 pages).

Decawave Application Note, "APS016: Moving from TREK1000 to a Product," v2.01, Decawave, 2015 (22 pages).

Chen, Hsieh-Chung et al., "Determining RF Angle of Arrival Using COTS Antenna Arrays: A Field Evaluation," in IEEE International Conference on Military Communication (MILCOM), 2012 (6 pages).

Wikipedia Contributors, "Law of Cosines," In Wikipedia, The Free Encyclopedia, updated May 18, 2018, accessed Jun. 27, 2018, https://en.wikipedia.org/wiki/Law_of_cosines (12 pages).

Wikipedia Contributors, "Multilateration," In Wikipedia, The Free Encyclopedia, updated May 24, 2018, accessed Jun. 27, 2018, https://en.wikipedia.org/wiki/Multilateration (6 pages).

Zhu, Ciyou et al., "Algorithm 778: L-BFGS-B: Fortran Subroutines for Large-Scale Bound-Constrained Optimization," ACM Transactions on Mathematical Software, vol. 23, No. 4, pp. 550-560, 1997 (11 pages).

Powell, M.J.D, "A view of algorithms for optimization without derivatives," 2007 (12 pages).

Kraft, Dieter, "A Software Package for Sequential Quadratic Programming", DFVLR-FB 88-28, 1988 (33 pages).

Decawave User Manual, DW1000 User Manual, DecaWave2017 (242 pages).

Decawave Application Note, "APS006 Part3: DW1000 Metrics for Estimation of Non Line Of Sight Operating Conditions," v1.0, DecaWave, 2016 (19 pages).

Wikipedia Contributors, "Random forest," In Wikipedia, The Free Encyclopedia, updated Jun. 20, 2018, accessed Jun. 27, 2018, https://en.wikipedia.org/wiki/Random_forest (10 pages).

Wikipedia Contributors, "Cryptographic has function," In Wikipedia, The Free Encyclopedia, updated Jun. 21, 2018, accessed Jun. 27, 2018, https://en.wikipedia.org/wiki/Cryptographic_hash_function (10 pages).

Mazraani, Rami et al., "Experimental results of a combined TDOA/ TOF technique for UWB based localization systems," IEEE intl. Conf. on Communications (ICC) Workshop on Advances in Network Localization and Navigation (ANLN), 2017.

\* cited by examiner

ULTRA-WIDEBAND BASED VEHICLE ACCESS SYSTEM AND COMMUNICATION PROTOCOL FOR LOCALIZATION OF A TARGET DEVICE

This application claims the benefit of priority of U.S. provisional application Ser. No. 62/691,820, filed on Jun. 29, 2018 the disclosure of which is herein incorporated by reference in its entirety.

FIELD

The device and method disclosed in this document relates to a vehicle access system and, more particularly, to and ultra-wideband based vehicle access system.

BACKGROUND

Unless otherwise indicated herein, the materials described in this section are not prior art to the claims in this application and are not admitted to the prior art by inclusion in this section.

Standard Passive Entry Systems (PES) key fobs typically operate on two radio frequencies (RF). For example, low frequency (LF) communication is used for proximity detection and localization required for the Comfort Entry Go (CEG) functionality. Another frequency, such as ultra-high frequency (UHF), is used to extend the communication range for Remote Keyless Entry (RKE) functionality. Passive Entry Systems (PES) have strict proximity/localization requirements. For example, with a PES system providing RKE and CEG, a vehicle unlocks the doors only when a driver or a person authorized to access is within a perimeter at ~2 m from the vehicle. The PES/CEG system further allows the user or the driver to start the engine only when the key fob is inside the vehicle. These localization requirements are hard to satisfy for any one wireless technology. Therefore, the current systems require LF, e.g. 125 kHz, antennas both inside and outside the vehicle along with optimal power control to satisfy the proximity/localization requirements. On the other hand, communication link from the key fob to the vehicle for RKE (i.e., when the user explicitly presses the lock/unlock button on the key fob) is based on UHF to satisfy both the range requirement (~50 m) and the antenna size requirement (i.e., the antenna needs to fit in a small key fob).

SUMMARY

A method of operating a vehicle access system having a plurality of system nodes arranged throughout a vehicle is disclosed. The method comprises: selecting a first set of system nodes in the plurality of system nodes, the first set of system nodes being a subset of the plurality of system nodes; transmitting, with each system node in first set of system nodes, a respective poll message to a target portable device and recording, with each system node in first set of system nodes, a first timestamp at which the respective poll message is transmitted; receiving a response message from the target portable device with a second set of system nodes in plurality of system nodes and recording, with each system node in second set of system nodes, a respective second timestamp at which the response message is received, the response message including one of (i) a respective third timestamp at which each respective poll message was received at the target portable device and a fourth timestamp at which the response message was transmitted and (ii) a respective wait time equal to a difference between the respective third timestamp and the fourth timestamp; determining a respective time of flight between the target portable device and each system node in the first set of system nodes based on the respective first timestamp, the respective second timestamp, and the one of (i) the respective third timestamp and the fourth timestamp and (ii) the respective wait time; determining a respective time difference of arrival between a first system node in the second set of system nodes and each other system node in the second set of system nodes based on the respective second timestamp recorded by the first system node and the respective second timestamp recorded by each other system node in the second set of system nodes; and determining a position of the target portable device relative to the vehicle based on (i) the respective time of flight between the target portable device and each system node in the first set of system nodes and (ii) respective time difference of arrival between a first system node in the second set of system nodes and each other system node in the second set of system nodes.

A vehicle access system is disclosed. The vehicle access system comprises: a plurality of system nodes arranged throughout a vehicle, each system node in the plurality of system nodes including a transceiver configured to communicate with a target portable device, the plurality of system nodes including a master system node and each other system node in the plurality of system nodes being a slave system node; and a vehicle computer operably connected to the master system node. One of the master system node and the vehicle computer is configured to select a first set of system nodes in the plurality of system nodes, the first set of system nodes being a subset of the plurality of system nodes. Each system node in the plurality of system node is configured to, in response to being one selected as one of the first set of system nodes, transmit a respective poll message to a target portable device and record a first timestamp at which the respective poll message is transmitted. A second set of system nodes in the plurality of system node that are in communication range of the target portable device are configured to receive a response message from the target portable device and record a respective second timestamp at which the response message is received, the response message including one of (i) a respective third timestamp at which each respective poll message was received at the target portable device and a fourth timestamp at which the response message was transmitted and (ii) a respective wait time equal to a difference between the respective third timestamp and the fourth timestamp. One of the master system node and the vehicle computer is configured to: determine a respective time of flight between the target portable device and each system node in the first set of system nodes based on the respective first timestamp, the respective second timestamp, and the one of (i) the respective third timestamp and the fourth timestamp and (ii) the respective wait time; determine a respective time difference of arrival between a first system node in the second set of system nodes and each other system node in the second set of system nodes based on the respective second timestamp recorded by the first system node and the respective second timestamp recorded by each other system node in the second set of system nodes; and determine a position of the target portable device relative to the vehicle based on (i) the respective time of flight between the target portable device and each system node in the first set of system nodes and (ii) respective time difference of arrival between a first system node in the second set of system nodes and each other system node in the second set of system nodes.

BRIEF DESCRIPTION OF THE DRAWINGS

The foregoing aspects and other features of the vehicle access system and method of operating the same are explained in the following description, taken in connection with the accompanying drawings.

DETAILED DESCRIPTION

Figure 1:
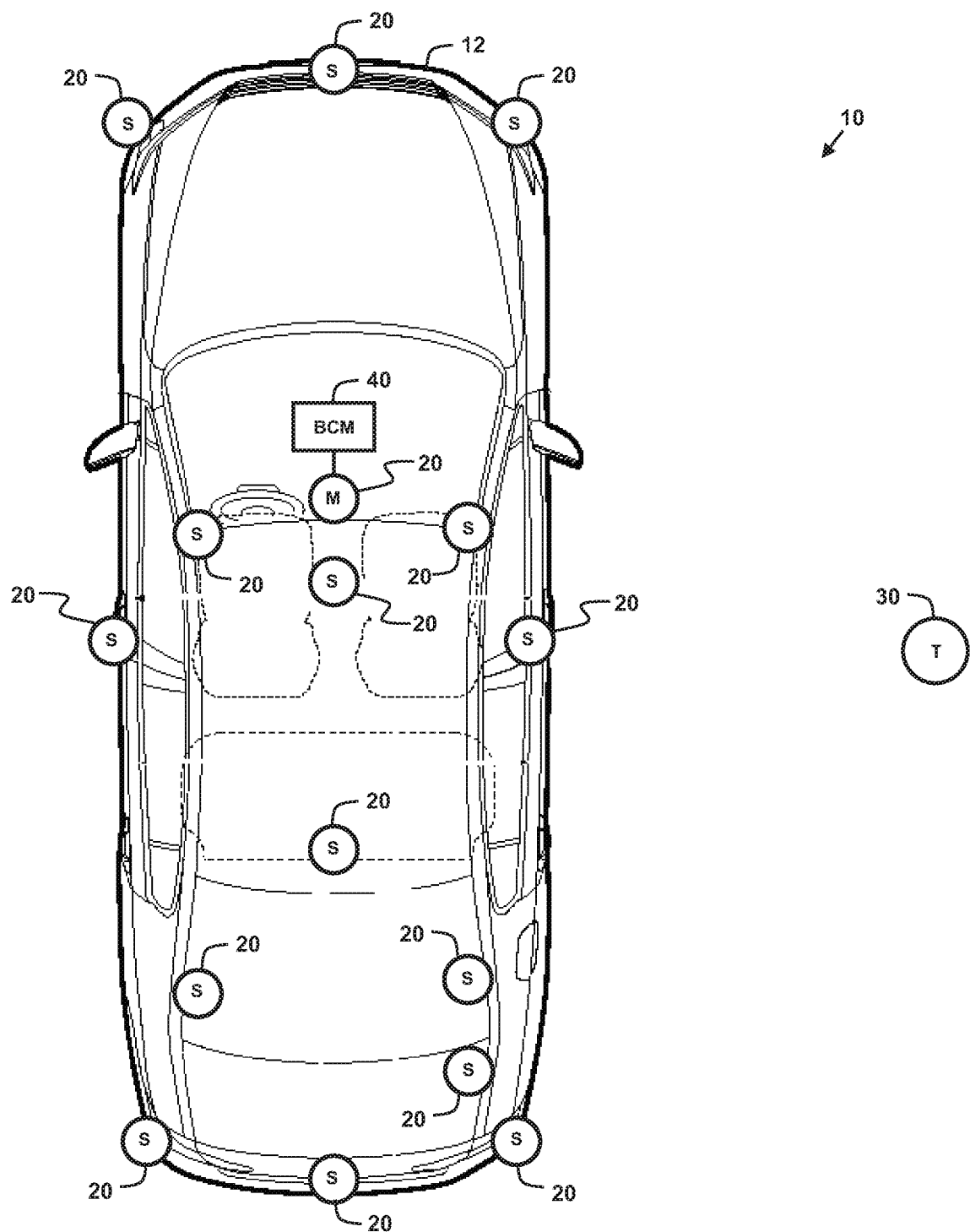
FIG. 1 shows an exemplary embodiment of a vehicle access system for a vehicle.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

Vehicle Access System

With reference to FIGS. 1 and 2A-2C, an exemplary embodiment of a vehicle access system 10 for a vehicle 12 is described. As shown in FIG. 1, the vehicle access system 10 includes a plurality of system nodes 20 arranged at various locations of the vehicle 12. It will be appreciated that the particular number of system nodes 20 and particular locations of the systems nodes 20 will depend on the desired accuracy and performance, as well as the particular make and model of the vehicle 12. In one embodiment, a minimum number of system nodes 20 to satisfy particular Thatcham category requirements are used (e.g., enabling vehicle lock/ unlock within two meter perimeter of vehicle and vehicle start when a target portable device is in the vehicle). The system nodes 20 are configured to communicate with target portable device 30 and, in particular, to enable determination of a position of the target portable device 30. In terms of network definition, the system nodes 20 include a plurality of slave system nodes S and a master system node M. In one embodiment, the master node M is defined as the system node 20 that connects a body computer module (BCM) 40 (or other such vehicle computer), and the slave system nodes S comprise the system nodes 20 which are part of the same network as the master system node M. The master system node M controls communication with the slave system nodes S and collects data from the slave system nodes S for the purpose of localizing the target portable device 30. Processing of the data collected from the system nodes 20 to localize the target portable device 30 is performed by the master system node M or the body computer module 40. In at least one embodiment, ultra-wideband (UWB) communications are utilized between the system nodes 20 and the target portable device 30 to enable localization thereof. A communication protocol will be described herein which enables localization of the target portable device 30 using the system nodes 20.

Figure 2A:
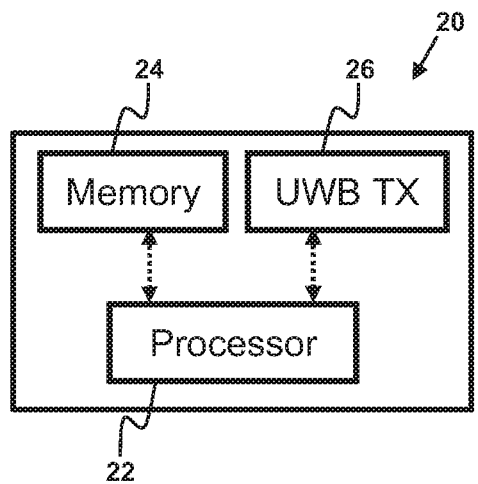
FIGS. 2A, 2B, and 2C show exemplary embodiments of a system node, a target portable device, and a body computer module, respectively, of the vehicle access system of FIG. 1.

FIG. 2A shows an exemplary embodiment of a system node 20. In the illustrated embodiment, each system node 20 comprises a processor 22, memory 24, and a transceiver 26. The memory 24 is configured to store program instructions that, when executed by the processor 22, enable the respective system node 20 to perform various operations described elsewhere herein, including localization of the target portable device 30. The memory 24 may be of any type of device capable of storing information accessible by the processor 22, such as write-capable memories, read-only memories, or other computer-readable mediums. Additionally, it will be recognized by those of ordinary skill in the art that a "processor" includes any hardware system, hardware mechanism or hardware component that processes data, signals or other information. The processor 22 may include a system with a central processing unit, multiple processing units, dedicated circuitry for achieving functionality, or other systems.

The transceiver 26 at least includes an ultra-wideband transceiver configured to communicate with the target portable device 30, but may also include any of various other devices configured for communication with other electronic devices, including the ability to send communication signals and receive communication signals. In some embodiments, the transceiver 26 comprises multiple ultra-wideband transceivers and/or multiple ultra-wideband antennas arranged in an array. In one embodiment, the transceiver 26 includes at least one further transceiver configured to communicate with the other system nodes 20 and/or the body computer module 40, via a wired or wireless connection.

Figure 2B:
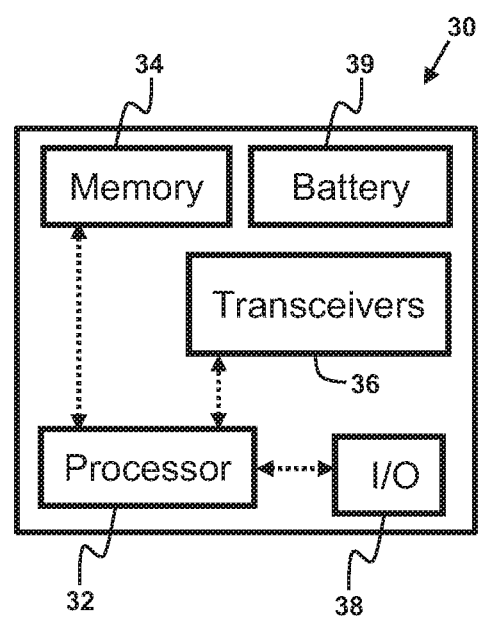

FIG. 2B shows an exemplary embodiment of a target portable device 30, which may comprise a key-fob, a smart phone, a smart watch, or the like. In the illustrated embodiment, the target portable device 30 comprises a processor 32, memory 34, transceivers 36, an I/O interface 38, and a battery 39. The memory 34 is configured to store program instructions that, when executed by the processor 32, enable the target portable device 30 to perform various operations described elsewhere herein, including communicating with the system nodes 20 for the purpose of localizing the target portable device 30. The memory 34 may be of any type of device capable of storing information accessible by the processor 32, such as a memory card, ROM, RAM, hard drives, discs, flash memory, or other computer-readable medium. Additionally, it will be recognized by those of ordinary skill in the art that a "processor" includes any hardware system, hardware mechanism or hardware component that processes data, signals or other information. The processor 32 may include a system with a central processing unit, multiple processing units, dedicated circuitry for achieving functionality, or other systems.

The transceivers 36 at least includes an ultra-wideband transceiver configured to communicate with the system nodes 20, but may also include any of various other devices configured for communication with other electronic devices, including the ability to send communication signals and receive communication signals. In one embodiment, the transceivers 36 further include additional transceivers which are common to smart phones and/or smart watches, such as Wi-Fi or Bluetooth® transceivers and transceivers configured to communicate via for wireless telephony networks. The I/O interface 38 includes software and hardware configured to facilitate communications with the one or more interfaces (not shown) of the target portable device 30, such as tactile buttons, switches, and/or toggles, touch screen displays, microphones, speakers, and connection ports. The battery 39 is configured to power the various electronic devices of the target portable device 30 and may comprise a replaceable or rechargeable battery.

Figure 2C:
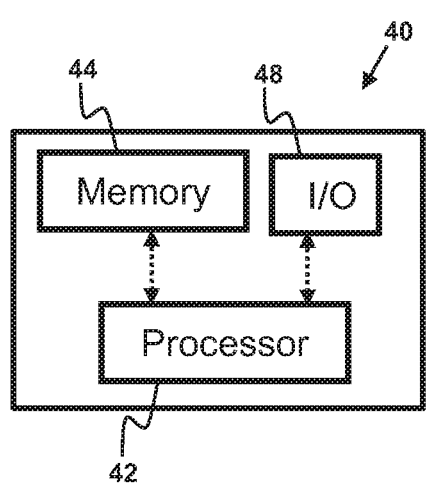

FIG. 2C shows an exemplary embodiment of a body computer module 40. The body computer module 40 is configured to control and monitor various body electronics functions in the vehicle 12 at least including functions of the vehicle access system 10 and, in some embodiments, also including functions such as exterior and interior lighting, windows, wipers, air-conditioning, heating functions, and parking aids. In the illustrated embodiment, the body computer module 40 comprises a processor 42, memory 44, and an I/O interface 48. The memory 44 is configured to store program instructions that, when executed by the processor 42, enable the body computer module 40 to perform various operations described elsewhere herein, including localization of the target portable device 30. The memory 44 may be of any type of device capable of storing information accessible by the processor 42, such as a memory card, ROM, RAM, hard drives, discs, flash memory, or other computer-readable medium. Additionally, it will be recognized by those of ordinary skill in the art that a "processor" includes any hardware system, hardware mechanism or hardware component that processes data, signals or other information. The processor 42 may include a system with a central processing unit, multiple processing units, dedicated circuitry for achieving functionality, or other systems. The I/O interface 38 includes software and hardware configured to facilitate monitoring and control of various body electronics functions.

Localization of the Target Portable Device

As discussed in further detail below, the communication protocol utilized by the vehicle access system 10 for localizing the target portable device 30 advantageously combines and optimizes multiple different processes for determining a position of the target portable device 30 with respect to the vehicle.

Figure 3:
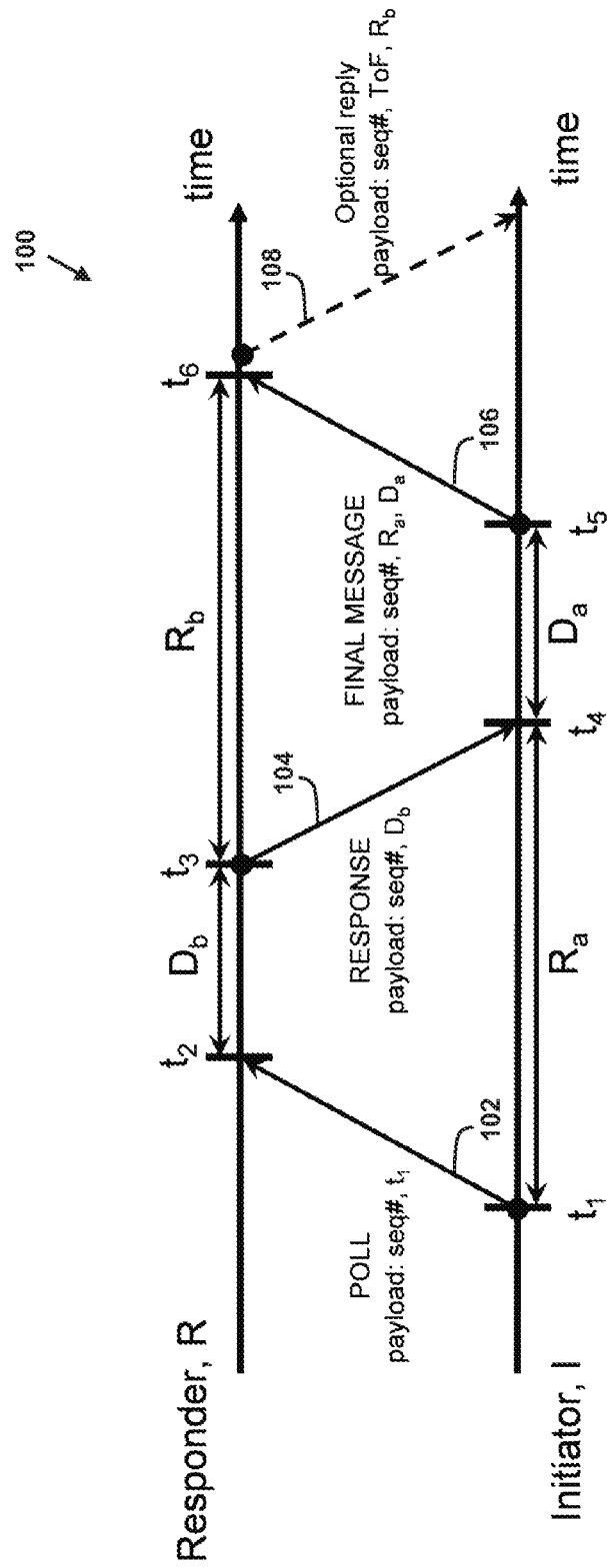
FIG. 3 illustrates one way ranging (OWR), two way ranging (TWR), and symmetric double-sided two way ranging (SDS-TWR) processes for determining a distance between two devices.

FIG. 3 illustrates a process 100 for determining a distance between two devices, an initiator I and a responder R, each of which may correspond to one of the system nodes 20 or the target portable device 30. A distance from a given system node 20 on the vehicle 12 can be computed by measuring a time of flight for a message communicated between the system node 20 and the target portable device 30. Time of flight (ToF) is the amount of time taken by the message to go from one device to the other. A distance between the devices is estimated based on the ToF, given that the message was travelling at speed of light. There are a few different ways to calculate the ToF, which are illustrated in FIG. 3, one way ranging (OWR), two way ranging (TWR), and symmetric double-sided two way ranging (SDS-TWR).

For one way ranging (OWR), the initiator I sends a poll message 102 with a timestamp $t_1$, at which it the initiator I started transmitting. The responder R receives the poll message 102 and records a timestamp $t_2$ at which the responder R received the poll message 102. The responder R calculates the ToF as a difference between the two timestamps $t_1$ and $t_2$ (i.e., $ToF=t_2-t_1$). A distance between the initiator I and the responder R can be calculated according to the equation $d_{I \to R}=c \times ToF$, where c is the speed of light.

For the purpose of localizing the target portable device 30, the initiator I may correspond to either of the target portable device 30 and a respective system node 20 and the responder R may correspond to the other of the target portable device 30 and the respective system node 20. The location of the initiator I ($x_I$, $y_I$, $z_I$) or the responder R ($x_R$, $y_R$, $z_R$) can be calculated according to spherical equations in the form of $(x_I-x_R)^2+(y_I-y_R)^2+(z_I-z_R)^2=d_{I \to R}^2$. However, we note that distance estimation is required from a minimum of four system nodes 20, at known locations, for 3D localization of the target portable device 30 and a minimum of three system nodes 20, at known locations, for 2D localization of the target portable device 30. Additionally, we note that, for the one way ranging process to accurately estimate ToF, the clocks of both the initiator I and the responder R must be accurately synchronized.

To avoid the synchronization requirement of the one way ranging process, a two way ranging (TWR) process can be used. Here, the initiator I sends the poll message 102 with a sequence number seq # and the timestamp $t_1$. The sequence number seq # is used to differentiate between successive transmissions. Particularly, when messages are not received by the responder R due to bad channel, the responder R needs to know what message it is responding to. The responder R then replies by sending a response message 104 with the sequence number seq # and an expected wait time $D_b$ between the timestamp $t_2$ at which the responder R received the poll message 102 and a timestamp $t_3$ at which the responder R sends the response message 104 (i.e., $D_b=t_3-t_2$). The initiator I receives the response message 104 and records a timestamp $t_4$ at which the initiator I received the response message 104. The initiator I calculates its overall round trip time $R_a$ as a difference between the timestamp $t_1$, at which it the initiator I sent the poll message 102 and the timestamp $t_4$, at which the initiator I received the response message 104 (i.e., $R_a=t_4-t_1$). The initiator I calculates the ToF as half the difference between the overall round trip time $R_a$ and the wait time $D_b$ (i.e., $ToF=(R_a-D_b)/2$). We note that the response message 104 can also be used to determine the ToF using the one way ranging process above (i.e., $ToF=t_4-t_3$). Thus, the two way ranging process can be thought of as performing two different one way ranging processes and determining the ToF as an average.

Finally, for an even more accurate estimation of time of flight, a symmetric double-sided two way ranging (SDS-TWR) process can be used. Particularly, this process mitigates effects of additional delays introduced into the system, such as antenna delays, clock delays, delays caused by the environment, etc. In this scheme, in addition after the two way ranging process, the initiator I sends a final message 106 to the responder R with the sequence number seq #, the round trip time $R_a$ and its own expected wait time $D_a$ between the timestamp $t_4$ at which the initiator I received the response message 104 and a timestamp $t_5$ at which the initiator I sends the final message 106 (i.e., $D_a=t_5-t_4$). The responder R receives the final message 106 and records a timestamp $t_6$ at which the responder R received the final message 106. The responder R calculates its overall round trip time $R_b$ as a difference between the timestamp $t_3$, at which it the responder R sent the response message 104 and the timestamp $t_6$, at which the responder R received the final message 106 (i.e., $R_b=t_6-t_3$).

In one embodiment, the responder R calculates the ToF according to the equation $\text{ToF}=(R_a R_b - D_a D_b)/(R_a+R_b+D_a+D_b)$. We note that the response message 104 and final message 106 can also be used to determine the ToF using the two way ranging process above (i.e., $\text{ToF}=(R_b-D_a)/2$). Thus, the symmetric double-sided two way ranging process can be thought of as performing two different two way ranging processes and determining the ToF as an average. In some embodiments, the responder R can also send an optional replay message 108 to the initiator I with the sequence number seq #, the calculated ToF, and the round trip time $R_b$.

Figure 4:
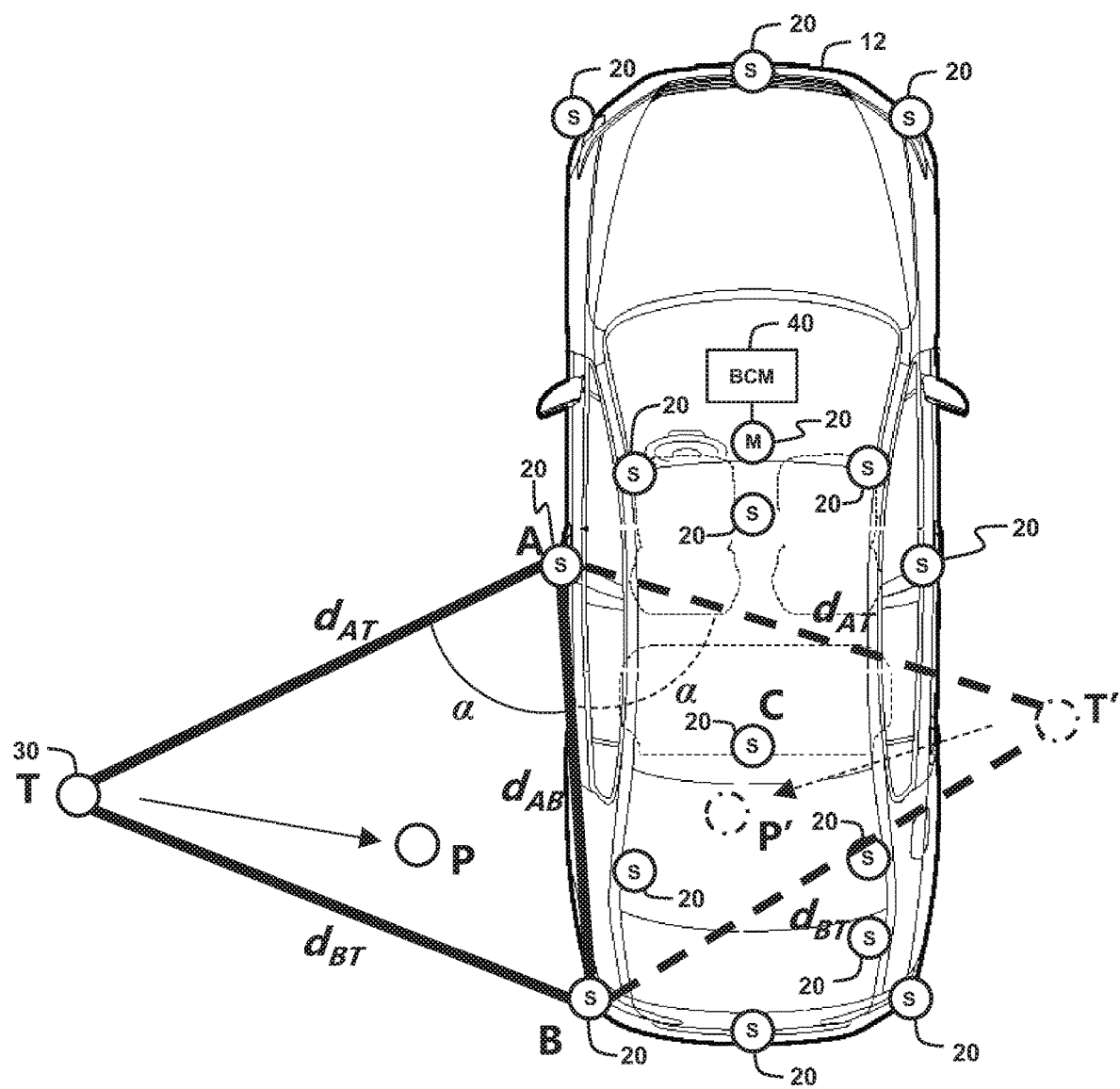
FIG. 4 illustrates an alternative process for localizing the target device based on an angle of a target device with respect to a line defined by the positions of two system nodes.

FIG. 4 illustrates an alternative process for localizing the target portable device 30 based on an angle $\alpha$ of a target portable device 30 with respect to a line $d_{AB}$ defined by the positions of two system nodes 20 at positions A and B of the vehicle 12. Particularly, to calculate the angle $\alpha$ with respect to a pair of nodes 20 at positions A and B, OWR, TWR, or SDS-TWR is used to determine the distance of the target portable device 30 to each of these two nodes 20 at positions A and B. Given that the positions A and B are known and constant, the distance between the positions A and B is also known and constant. Accordingly, all three sides of a triangle formed by the two system nodes 20 at positions A and B and the target portable device 30 are known (i.e., the lines $d_{AB}$, $d_{AT}$, and $d_{BT}$). The law of cosines can be used to calculate the angle between any two sides of the triangle. For example the angle $\alpha$ of a target portable device 30 with respect to the line $d_{ab}$ can be calculated according to the equation $\cos(\alpha)=(d_{AB}^2+d_{AT}^2-d_{BT}^2)/(2d_{AB}d_{AT})$. Similarly, when the angle $\alpha$ and, for example, the distances $d_{AB}$ and $d_{AT}$ are known, the distance $d_{BT}$ from the target portable device 30 to the system node 20 at the position B can be calculated according to the equation $d_{BT}^2=d_{AB}^2+d_{AT}^2-2d_{AB}d_{AT}\cos(\alpha)$.

We note that, based on the distances and angle from only the nodes 20 at positions A and B, it cannot be determined which side of the pair of nodes 20 at positions A and B the target portable device 30 is on. As shown in FIG. 4, the actual location of target portable device 30 is T, however, with respect to the pair of nodes 20 at positions A and B, the target portable device 30 can be at the location T' as well. To break this tie, we need estimation from 3$^{rd}$ system node on the vehicle, such as the system node 20 at the position C. However, when the target portable device 30 is within the vehicle then, using the car's state information, one can still identify the position of the target portable device 30. As an example, if the vehicle's initial state is locked and static, and the target portable device 30 is now at location P, then it can correctly identify that the target portable device 30 is at location P and not at P'. It will be appreciated that, if any one of these pair of nodes 20 at have multiple antennas then two nodes 20 are enough to localize the target portable device 30.

Figure 5B:
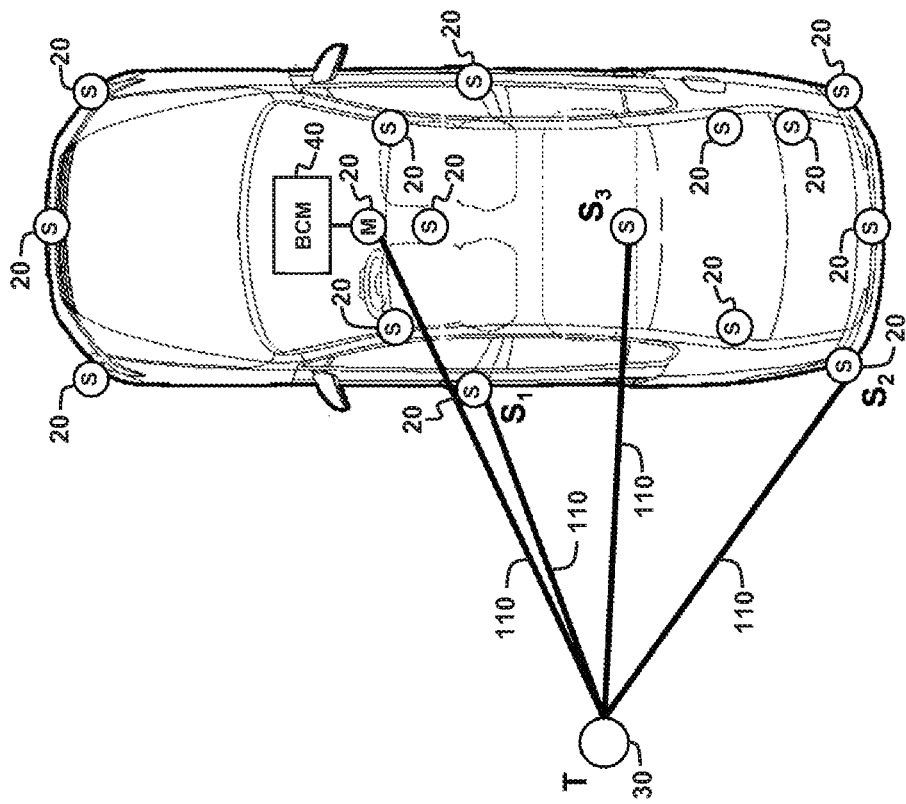
FIGS. 5A and 5B illustrate a further process for localizing the target portable device based on a time difference of arrival (TDoA) of a message from a target portable device.
Figure 5A:
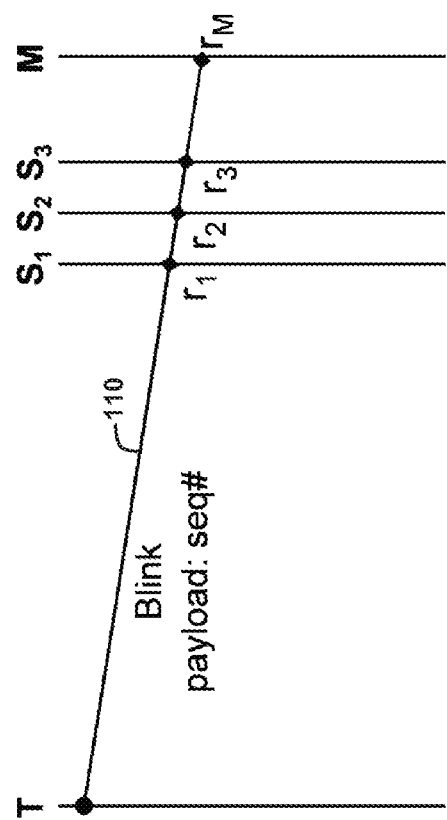

FIGS. 5A and 5B illustrate a further process for localizing the target portable device 30 based on a time difference of arrival (TDoA) of a message from a target portable device 30. Particularly, as shown in FIGS. 5A and 5B, the target portable device 30 (T) broadcasts a blink message 110 with a sequence number seq #. A plurality of the system nodes 20 ($S_1$, $S_2$, $S_3$, and $S_M$) receive the blink message 110 and each record a respective timestamp $r_1$, $r_2$, $r_3$, and $r_M$ at which the respective system node 20 received the blink message 110. As can be seen, the blink message 110 is received by the system nodes 20 ($S_1$, $S_2$, $S_3$, and M) at different times depending on their respective distance from the target portable device 30 (T).

Distances between the target portable device 30 (T) and each of the system nodes 20 ($S_1$, $S_2$, $S_3$, and $S_M$) and the location of the target portable device 30 can be calculated according to the hyperboloid equations:

$$d_{M \to T} - d_{S_j \to T} = c \times \text{TDoA}_{M \to S_j} = c \times (r_M - r_j - o_j),$$

$$d_{S_j \to T} = \sqrt{(x_{S_j}-x_T)^2+(y_{S_j}-y_T)^2+(z_{S_j}-z_T)^2}, \text{ and}$$

$$d_{M \to T} = \sqrt{(x_M-x_T)^2+(y_M-y_T)^2+(z_M-z_T)^2},$$

where $j \in [1, m]$, m is the number of slave system nodes that received the blink message 110, the coordinates of the slave system nodes $S_j$ are denoted by $(x_j, y_j, z_j)$, the coordinates of the master system node M are denoted by $(x_M, y_M, z_M)$, the coordinates of the target portable device T are denoted by $(x_T, y_T, z_T)$, $o_j$ is a clock offset between the master system node M and the respective slave system node $S_j$, and c is the speed of light.

We note that this process requires tight time synchronization among the system nodes 20 to ensure that respective clock offsets $o_j$ between the master system node M and different slave system nodes $S_j$ are at a minimum. Additionally, for this process, a minimum of five system nodes 20 (at known locations) is required for 3D localization and a minimum of four system nodes 20 (at known locations) is required for 2D localization.

Of all these localization processes, distance estimation via TWR localization process is easiest to implement. Angle estimation by a single system node 20 requires an antenna array at the receiver, which increases cost and complexity. However, angle estimation with respect to a pair of system nodes 20 is easy to implement as it is based on distance estimation. A merit of the TDoA localization process is that it is very power efficient for the target portable device 30 as the device only needs to send one message and the rest of the complexity lies with the system nodes 20 on the vehicle 12. On the other hand, the TDoA localization process requires tight synchronization among the system nodes 20 on the vehicle 12. Further, in the case that we do not have enough system nodes 20 on the vehicle 12 that can communicate with the target portable device 30 the process fails. We note that, depending on the location of the target portable device 30 with respect to the vehicle 12, only a subset of system nodes 20 on vehicle 12 will be able to communicate with the target portable device 30. This subset can be totally empty or may include all system nodes 20. In cases when this subset does not have enough nodes required to localize the target with respect to the car, the TWR distance estimation method will at least give: distance (proximity) with respect to a given node when only one system node 20 is able to communicate with the target portable device 30, distance with respect to two nodes and respective angle when two system nodes 20 can communicate with the target portable device 30, and 2D localization when three system nodes 20 can communicate with the target portable device 30. Accordingly, as will be discussed in greater detail below, a combination of the different localization processes provides an optimal solution.

Optimizations of Communication Protocols for Localization Processes

Below we discuss various ways in which each cycle of the communication protocols implementing the localization processes described above can be optimized to arrive at an optimal communication protocol that combines the multiple different localization processes.

Figure 6B:
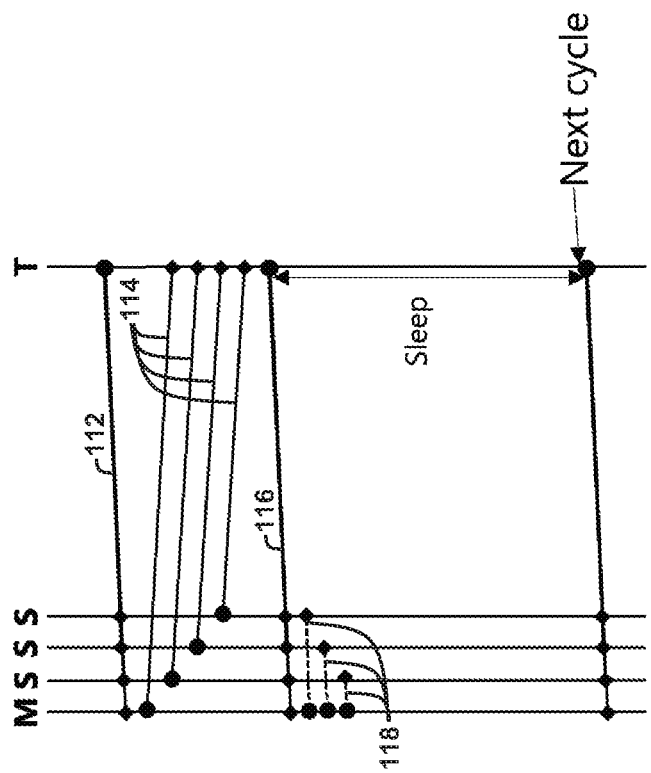
FIGS. 6A and 6B illustrate how a communication protocol for a SDS-TWR localization process can be optimized to improve the power efficiency at the target portable device.
Figure 6A:
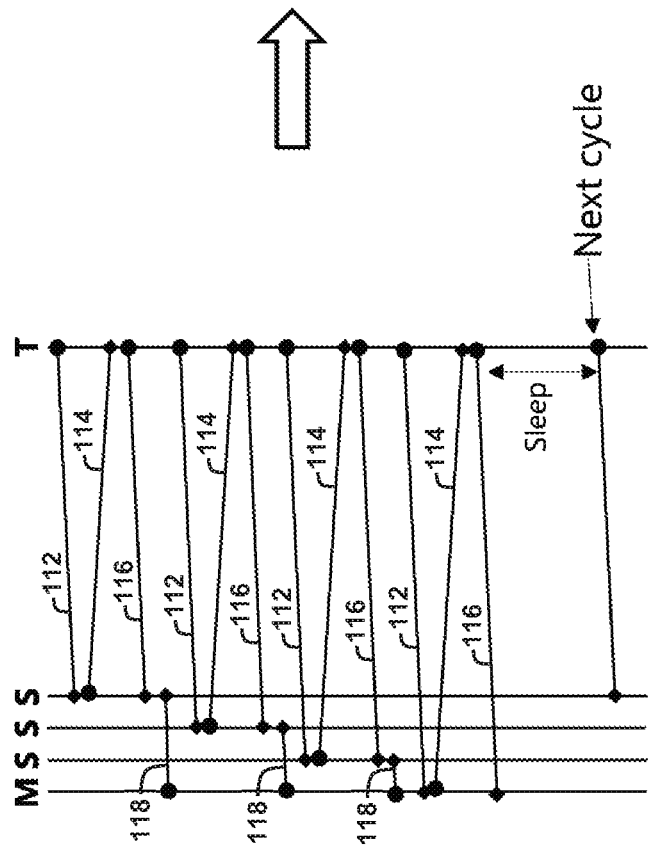

FIGS. 6A and 6B illustrate how a cycle of a communication protocol for the SDS-TWR localization process can be optimized to improve the power efficiency at the target portable device 30. Particularly, of all the localization processes described above, a SDS-TWR method is one of the most accurate and one of the easiest to implement. However, it may not be power efficient. As shown in FIG. 6A, a target portable device T initiates SDS-TWR with the system nodes M, S, S, and S serially by sending a poll message 112 to each system node M, S individually. Each system node M, S transmits a response message 114 after receiving the respective poll message. The target portable device T responds with a final message 116 after receiving each response message 114. Each system node then calculates the ToF with respect to the target portable device T, per the process illustrated with respect to FIG. 3. The slave system nodes S then send their calculated ToF information to the master system node M in an information message 118. Alternatively, the slave system nodes S simply transmit their respective timestamps to the master system node M, which then calculates the distances and location of the target portable device T. As can be seen, the target portable device T must transmit eight different messages and receive four different messages each cycle and is only able to sleep for a small portion of each cycle of the communication protocol. We note that in some embodiments, the cycle time is pre-determined periodic time period for location estimation for the target portable device 30. In some embodiments, the cycle time can be fixed or variable.

FIG. 6B shows an optimization of the SDS-TWR protocol shown in FIG. 6A. Particularly, in order to minimize the number of messages from the target portable device T, the poll messages 112 and final messages 116 from the target portable device T for each system node M, S are consolidated into one poll message 112 and one final message 116. In this way, the number of messages sent by the target portable device T is reduced to only two messages per cycle of the communication protocol. Furthermore, the optimization enables the target portable device T to sleep for a large portion of each cycle time.

Figure 7:
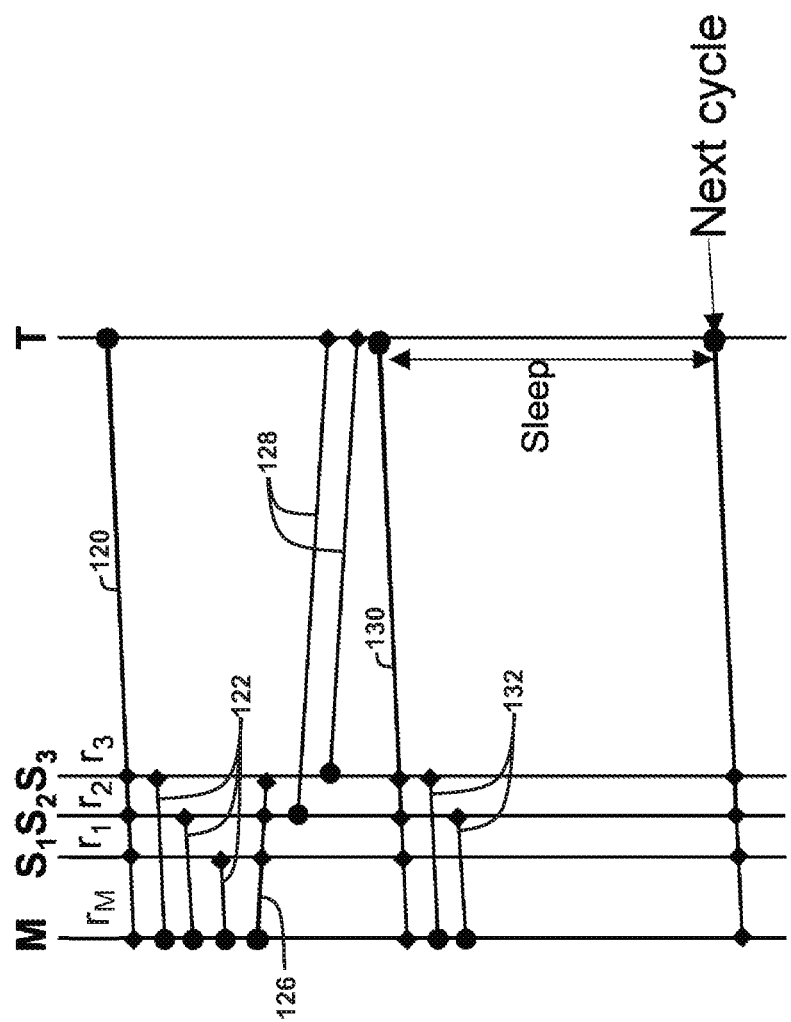
FIG. 7 illustrates how a communication protocol can be further optimized by utilizing a combination of TDoA and SDS-TWR.

FIG. 7 illustrates how the communication protocol can be further optimized by utilizing TDoA and SDS-TWR to further to improve the power efficiency at the target portable device 30. Particularly, the target portable device T sends a poll message 120 which also functions as a blink message for a TDoA process. The system nodes M, $S_1$, $S_2$, and $S_3$ each receive the poll/blink message 120 and record timestamps $r_1$, $r_2$, $r_3$, and $r_M$, as described above with respect to the TDoA process. The slave system nodes $S_1$, $S_2$, and $S_3$ send a data message 122 with the timestamps $r_1$, $r_2$, $r_3$, and $r_M$ at which the poll/blink message 120 was received, and any additional metadata. Using a selection message 126, the master node M then selects a subset of the slave system nodes $S_1$, $S_2$, and $S_3$ that received the poll/blink message 120 to proceed with optimized SDS-TWR with the target portable device T. The selected subset of slave system nodes $S_2$ and $S_3$ each send a response message 128 and the target portable device T responds with a final message 130, as discussed above with respect to the SDS-TWR process. The selected subset of slave system nodes $S_2$ and $S_3$ then send their calculated ToF information (or respective timestamps) to the master system node M in an information message 132. The master system node M can calculate the distances and location of the target portable device T using use of a combination of TDoA, using received timestamps $r_j$ from each slave system node $S_j$, and SDS-TWR with selected subset of system nodes $S_2$ and $S_3$. As can be seen, by optimizing in this way, the number of received messages at the target portable device 30 is reduced, providing further power efficiency gains at the target portable device T.

Figure 8B:
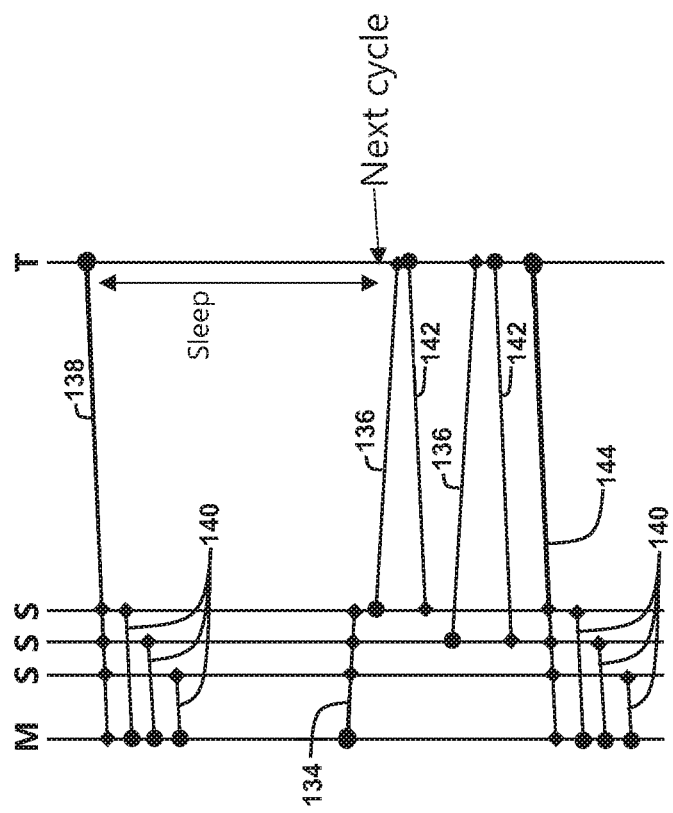
FIGS. 8A and 8B illustrate how a communication protocol can be further optimized by scheduling messages from the system nodes at the beginning of the next cycle.
Figure 8A:
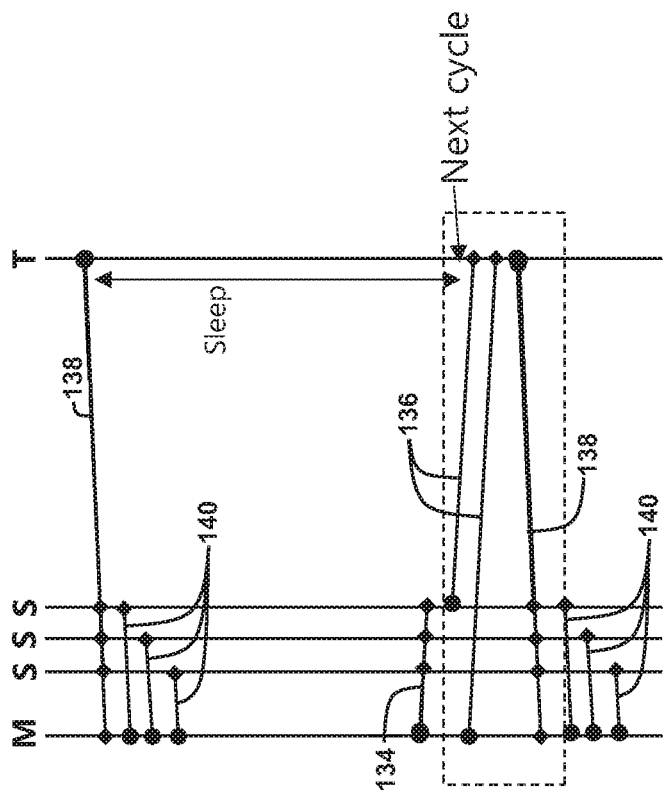

FIGS. 8A and 8B illustrate how a communication protocol can be further optimized by scheduling messages from the system nodes at the beginning of the next cycle. In the protocol of FIG. 8A, just before the end of each cycle, the master system node M selects a subset of the system nodes M, S with a selection message 134 (which may include the master system node M itself). At the start of each cycle, the selected subset of system nodes M, S each transmits a poll message 136. The target portable device T responds with a response message 138, which also operates as blink message for the TDoA process. After receiving the response/blink message 138, the slave nodes S each send a data message 140 with the timestamps at which the response/blink message 138 was received, and any additional metadata. The master system node M can calculate the distances and location of the target portable device T using use of a combination of TDoA, using received timestamps $r_j$ from each slave system node $S_j$, and TWR with selected subset of system nodes M, S. As can be seen, with this further optimization, the target portable device T only needs to wake for a short window of time during each cycle. FIG. 8B shows a variation of the protocol of FIG. 8A in which, to enhance accuracy, a subset of system nodes S each perform an explicit TWR with the target portable device. The target portable device T sends a separate response messages 142 and a blink message 144. In both of these optimizations, TWR is initiated by system nodes on the vehicle.

Method of Operating the Vehicle Access System with Optimal Communication Protocol Methods for operating the vehicle access system 10 are described below. In particular, methods of operating the system nodes 20, the target portable device 30, and/or the body computer module 40 to provide localization of the target portable device 30 are described. In the description of the methods, statements that a method is performing some task or function refers to a controller or general purpose processor executing programmed instructions stored in non-transitory computer readable storage media operatively connected to the controller or processor to manipulate data or to operate one or more components in the vehicle access system 10 to perform the task or function. Particularly, the processors 22 of system nodes 20, the processor 32 of the target portable device 30, and/or the processor 42 of the body computer module 40 above may be such a controller or processor. Alternatively, the controller or processor may be implemented with more than one processor and associated circuitry and components, each of which is configured to form one or more tasks or functions described herein. Additionally, the steps of the methods may be performed in any feasible chronological order, regardless of the order shown in the figures or the order in which the steps are described.

Figure 9:
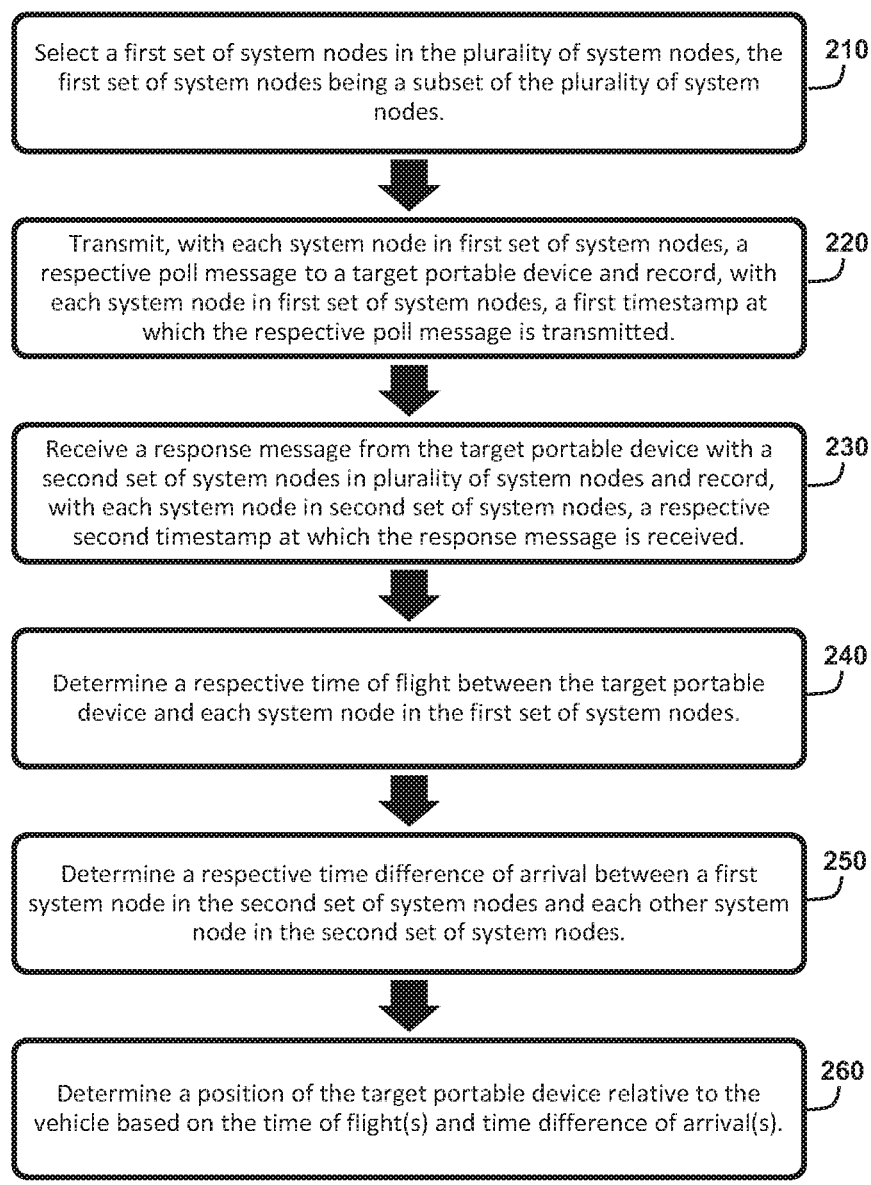
FIG. 9 shows a logical flow diagram for a method operating a vehicle access system to localize a target portable device.

FIG. 9 shows a logical flow diagram for a method 200 operating a vehicle access system 10 to localize a target portable device 30. The method 200 improves upon the functioning of the vehicle access system 10 and, more particularly, the functioning of the processor 22 of the system nodes 20, the processor 32 of the target portable device 30, and/or the processor 42 of the body computer module 40 by advantageously combining the TDoA and TWR distance determination processes. Additionally, the method 200 advantageously minimizes the number of messages sent and received by the target portable device 30, thereby improving the power efficiency thereof. Furthermore, the method 200 schedules messages between the system nodes 20 and target portable device 30 so as to minimize the wake time of the target portable device 30, thereby further improving the power efficiency thereof. Finally, the method 200 adapts depending on a number of system nodes 20 which are able to communicate with the target portable device in order to provide the best possible localization accuracy under the circumstances.

We note that the localization of the target portable device 30 has many uses for improving the convenience and security of the vehicle 12. Particularly, in at least one embodiment, the processor 42 of the body computer module 40 is configured to unlock the doors of the vehicle 12 in response to the target portable device 30 being within a predetermined range of the vehicle 12 (e.g., 3 meters) based on the determined position of the target portable device 30. In at least one embodiment, the processor 42 of the body computer module 40 is configured to prevent an engine of the vehicle 12 from being started unless the target portable device 30 is inside the vehicle 12 based on the determined position of the target portable device 30.

The method 200 begins with a step of selecting a first set of system nodes in the plurality of system nodes, the first set of system nodes being a subset of the plurality of system nodes (block 210). Particularly, with respect to the embodiments described in detail herein, the processor 22 of the master system node 20 (M) and/or the processor 42 of the body computer module 40 is configured to select set of n system nodes 20, where n is less than the total number N of system nodes 20 in the vehicle access system 10 (i.e., n<N). As discussed in further detail below, the selected set of n system nodes 20 are utilized to perform a TWR process with the target device 30.

In at least one embodiment, the processor 22 and/or the processor 42 is configured to determine the number n of system nodes 20 to be selected depending on a number m of system nodes 20 that are in communication range with the target device 30, where n is less than or equal to m (i.e. n≤m). Particularly, as will be discussed in further detail later, depending on the location of the target portable device 30 with respect to the vehicle 12, only a subset of the system nodes 20 may be in communication range of the target portable device 30. The number of system nodes 20 in communication range of the target portable device 30 is referred to herein as m. Naturally, the set of n system nodes 20 selected for each cycle must be of a size that is less than or equal to the number m of system nodes 20 in communication range of the target portable device 30. In at least one embodiment, the number m is the number system nodes 20 that received communications from the target portable device 30 and, therefore, varies between each cycle of the communication protocol.

In some embodiments, if the number m of system nodes 20 in communication range of the target portable device 30 exceeds three (i.e. m>3) or some other predetermined threshold, the processor 22 and/or the processor 42 is configured to set n=1 and select a single system node 20 to be in the set of n system nodes 20. Additionally, if the number m of system nodes 20 in communication range of the target portable device 30 is equal to three or equal to two (i.e. m=3 or m=2) or equal to some other predetermined value, the processor 22 and/or the processor 42 is configured to set n=2 and select two system nodes 20 to be in the set of n system nodes 20. Finally, if the number m of system nodes 20 in communication range of the target portable device 30 is equal to one (i.e. m=1) or equal to some other predetermined value, the processor 22 and/or the processor 42 is configured to set n=1 and select a single system node 20 to be in the set of n system nodes 20.

In at least one embodiment, the processor 22 and/or the processor 42 is configured to preferentially select the master system node 20 (M) as part of the selected set of n system nodes 20. In the circumstance that n=1, the processor 22 and/or the processor 42 is configured to preferentially select the master system node 20 (M) as the sole system node in the selected set of n system nodes 20.

In at least one embodiment, the processor 22 and/or the processor 42 is configured to select the set of n system nodes 20 depending on locations of the system nodes, a signal strength from the target portable device 30 at the system nodes 20, and/or lines of sight of the system nodes 20 with respect to the target portable device 30. Particularly, in many instances, the number m of system nodes 20 in communication range of the target portable device 30 will exceed the number n system nodes 20 which are to be utilized to perform a TWR process with the target device 30 (i.e., m>n). Accordingly, the processor 22 and/or the processor 42 can select which of the m available system nodes 20 to include the set of n system nodes 20. In some embodiment, the processor 22 and/or the processor 42 is configured to select as the set of n system nodes 20 those having locations that are closest to a last known location of the target portable device 30. In some embodiments, the processor 22 and/or the processor 42 is configured to select as the set of n system nodes 20 those having the greatest received signal strength from the target portable device 30.

In some embodiments, the processor 22 and/or the processor 42 is configured to use Channel State Information (CSI) metadata and/or Channel Impulse Response (CIR) metadata to determine which of the system nodes 20 are under light-of-sight (LOS) conditions or non-line-of-sight (NLOS) conditions. In some embodiments, the CIR metadata includes one or more of (i) first path and peak path index, (ii) a probability of NLOS estimate, and (iii) confidence level. In one embodiment, the processor 22 and/or the processor 42 is configured to calculate a probability of LOS or NLOS with the target portable device 30 for each available system node 20 based on the CIR metadata using a classification model. The processor 22 and/or the processor 42 is configured to select as the set of n system nodes 20 those having the highest probability of LOS with the target portable device 30.

In some embodiments, the processor 22 and/or the processor 42 is configured to determine the number m of system nodes 20 that are in communication range based on the Channel State Information (CSI) metadata and/or the Channel Impulse Response (CIR) metadata. The processor 22 and/or the processor 42 is also configured to select as the set of m system nodes 20 those having at least a predetermined probability of LOS and/or those having a highest probability of LOS with the target portable device 30 for positioning estimation. In this way, in at least some embodiments, the number m of system nodes 20 that are in communication range refers to a group of the system nodes 20 which are in communication with the target device 30 and have a good communication link with the target device 30. Accordingly, the number m of system nodes 20 that are in communication range with the target device 30 may be fewer than the number of system nodes 20 that have received communications from the target device 30.

In at least one embodiment, after selecting the set of n system nodes 20, the processor 22 of the master system node 20 (M) is configured to transmit a selection message to the system nodes 20 of the vehicle 12 indicating which system nodes are selected to perform a TWR process with the target portable device 30. In one embodiment, the selection message also acts to synchronize the clocks of the system nodes 20.

Figure 10:
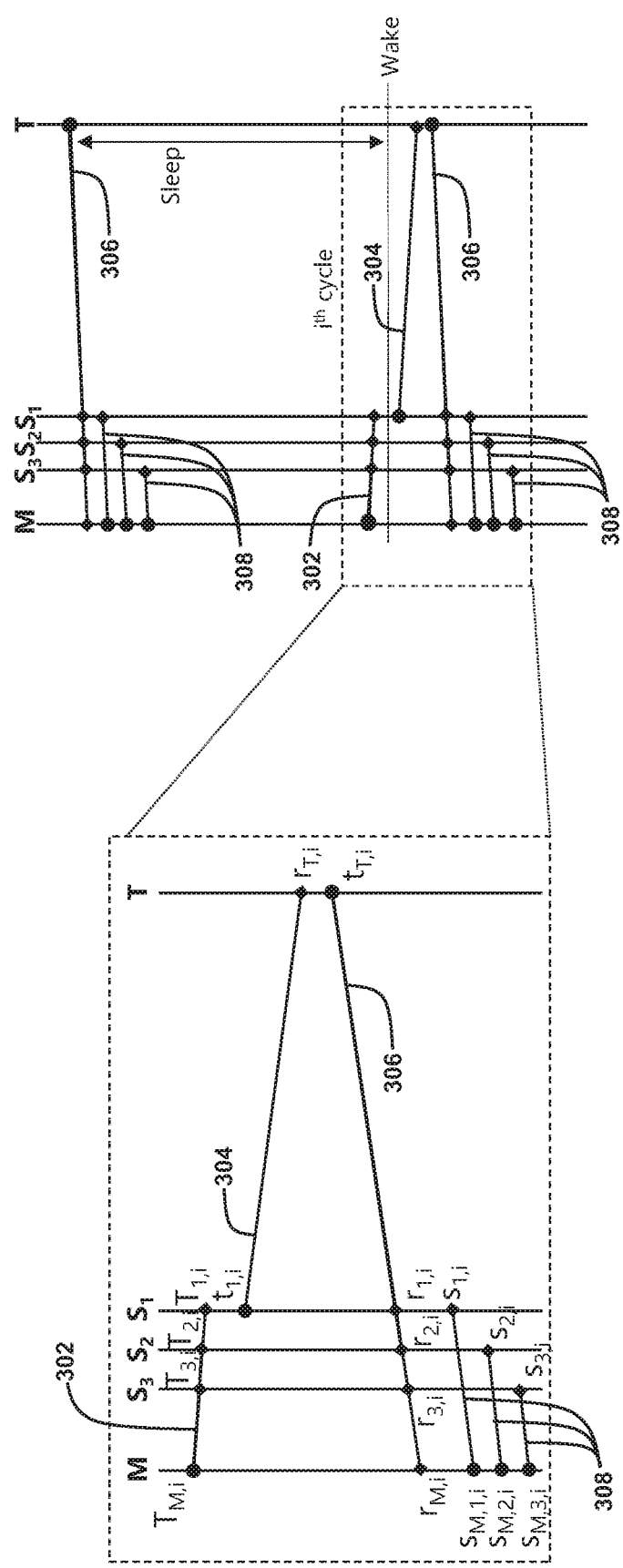
FIG. 10 illustrates an $i^{th}$ localization cycle of a communication protocol between the system nodes and the target portable device.

FIG. 10 illustrates an $i^{th}$ localization cycle of a communication protocol between the system nodes 20 and the target portable device 30. At a beginning of the $i^{th}$ cycle, the processor 22 of master system node 20 (M) to transmit a selection/synchronization message 302 to the system nodes 20 ($S_1$, $S_2$, $S_3$), at a time $T_{M,i}$ and records the timestamp $T_{M,i}$. The system nodes 20 ($S_1$, $S_2$, $S_3$) receive the selection/synchronization message 302 at times $T_{1,i}$, $T_{2,i}$, and $T_{3,i}$ and each record the respective timestamps $T_{1,i}$, $T_{2,i}$, and $T_{3,i}$. We note that in the timestamps T and other timestamps of FIG. 10, the first indicia j (e.g., M, 1, 2, 3, or T) indicates the ID of the respective device and the second indicia i indicates the cycle number.

In at least one embodiment, the selection/synchronization message 302 includes the node ID(s) for the selected set of n system nodes 20. In at least one embodiment, the selection/synchronization message 302 includes the transmission timestamp $T_{M,i}$ and the processor 22 of the slave system nodes 20 ($S_1$, $S_2$, $S_3$) is configured to synchronize or set its clock based on the transmission timestamp $T_{M,i}$. In some embodiments, the selection/synchronization message 302 further includes a sequence number seq #, which identifies the cycle (e.g., seq #=i). In some embodiments, the selection/synchronization message 302 further includes a cycle time (discussed in more detail below).

Returning to FIG. 9, the method 200 continues with a step of transmitting, with each system node in first set of system nodes, a respective poll message to a target portable device and record, with each system node in first set of system nodes, a first timestamp at which the respective poll message is transmitted (block 220). Particularly, with respect to the embodiments described in detail herein, the processor 22 of each of the selected set of n system nodes 20 is configured to operate the respective transceiver 26 to transmit a TWR poll message to the target device 30 at a time $t_{j,i}$. More particularly, in at least one embodiment, the processor 22 of each system node 20 is configured to operate the respective transceiver 26 to transmit a TWR poll message to the target device 30 in response to receiving a selection/synchronization message from the master system node 20 (M) that includes a corresponding node ID indicating that the respective system node 20 is one of the selected set of n system nodes 20. The processor 22 of each system node 20 is configured to record the timestamp $t_{j,i}$ at which the respective poll message was transmitted.

With reference to FIG. 10, in the exemplary $i^{th}$ localization cycle, only one system node 20 ($S_1$) is selected for transmitting a TWR poll message 304 (i.e., n=1). The processor 22 of each of the selected set of n system nodes 20 is configured to operate the respective transceiver 26 to transmit the TWR poll message 304 to the target device 30 at a time $t_{1,i}$, the timestamp of which is recorded by the system node 20 ($S_1$). In some embodiments, the TWR poll message 304 includes the sequence number seq #, the node ID of the system node 20 which sent the respective TWR poll message 304, and the cycle time. However, we note that each of these fields are optional and that the protocol will work even if the TWR poll message 304 does not include any fields or payload.

The processor 32 of the target portable device 30 is configured to operate the transceiver 36 to receive the TWR poll message(s) 304 from the selected set of n system nodes 20 at a time $r_{T,i}$ and record the respective timestamp(s) $r_{T,i}$ at which the poll message(s) 304 are received. It will be appreciated that, the smaller the set of n system nodes 20 is, the fewer TWR poll message(s) 304 are received by the target portable device 30. Accordingly, by minimizing the size of the selected set of n system nodes 20 (i e minimizing n), the number of messages received by the target portable device 30 is also minimized, thereby improving power efficiency at the target portable device 30.

Figure 11:
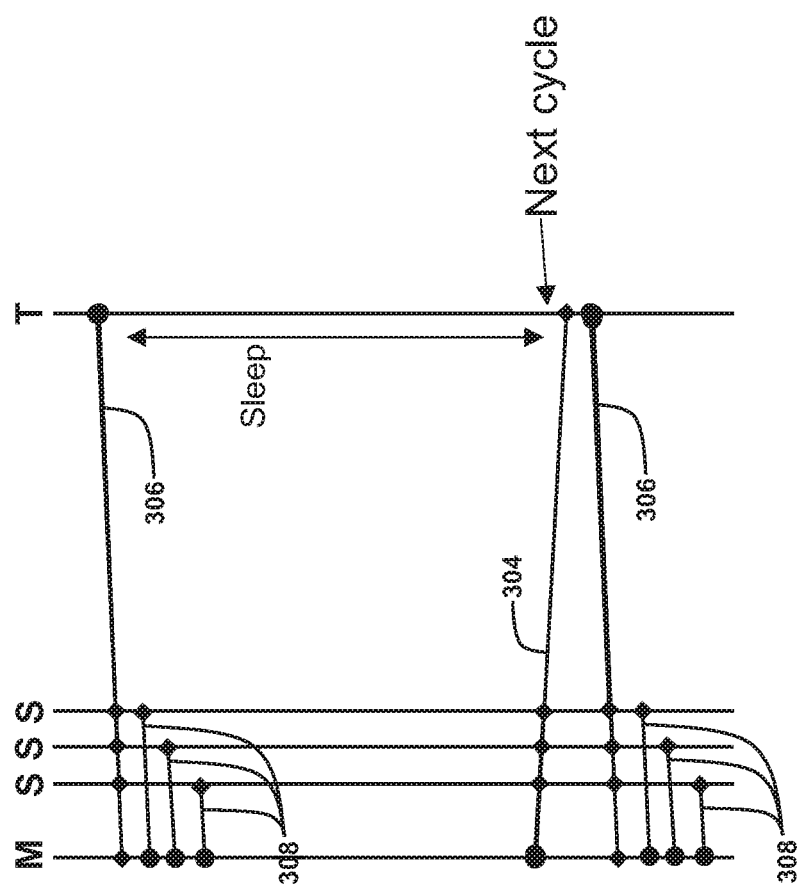
FIG. 11 illustrates an optimization of the communication protocol of FIG. 10 in which the master system node selects itself to perform a TWR process.

As discussed above, in at least one embodiment, the processor 22 and/or the processor 42 is configured to preferentially select the master system node 20 (M) as part of the selected set of n system nodes 20. In the circumstance that n=1, the processor 22 and/or the processor 42 is configured to preferentially select the master system node 20 (M) as the sole system node in the selected set of n system nodes 20. In this case, as illustrated in FIG. 11, the selection/synchronization message 302 can be eliminated and the TWR poll message 304 can advantageously incorporate the synchronization function of the selection/synchronization message 302 by further including the transmission timestamp $T_{M,i}$. The processor 22 of the slave system nodes 20 ($S_1$, $S_2$, $S_3$) is configured to synchronize and/or set its clock based on the transmission timestamp $T_{M,i}$.

Returning to FIG. 9, the method 200 continues with a step of receiving a response message from the target portable device with a second set of system nodes in plurality of system nodes and record, with each system node in second set of system nodes, a respective second timestamp at which the response message is received (block 230). Particularly, with respect to the embodiments described in detail herein, the processor 32 of the target portable device 30 is configured to operate the transceiver 36 to transmit a response/blink message, which functions as a TWR response for a TWR process and as a TDoA blink message for a TDoA process. The response/blink message at least includes the expected wait time(s) $t_{T,i}-r_{T,i}$ or the individual timestamps $t_{T,i}$ and $r_{T,i}$, where the timestamp(s) $r_{T,i}$ are the times at which the target portable device 30 received the TWR poll message (s) and the timestamp $t_{T,i}$ is the time at which target portable device 30 sends the response/blink message. In cases when the target portable device 30 did not receive any TWR poll message(s) then it only send its own transmission timestamp $t_{T,i}$. In some embodiments, the response/blink message includes the sequence number seq #, the node IDs of the system nodes 20 from which the target portable device 30 received the TWR poll message(s), and the cycle time.

The processor 22 of each of the system nodes 20 in communication range of the target portable device 30 is configured to operate the respective transceiver 26 to receive the response/blink message from the target device 30 at a time $r_{j,i}$, the timestamp of which is recorded by each system node 20.

With reference to FIG. 10, in the exemplary $i^{th}$ localization cycle, the target portable device 30 (T) transmits a response/blink message 306 at the time $t_{T,i}$ and the system nodes 20 ($S_1$, $S_2$, $S_3$, and M) in communication range of the target portable device 30 (T) receive the response/blink message 306 at the times $r_{1,i}$, $r_{2,i}$, $r_{3,i}$, and $r_{M,i}$, respectively.

In at least one embodiment, after receiving the response/blink message 306, the processor 22 of each of the slave system nodes 20 ($S_1$, $S_2$, and $S_3$) that received the response/blink message 306 is configured to transmit a data message 308 to the master system node 20 (M). The data message 308 at least includes the timestamps $r_{j,i}$ ($r_{1,i}$, $r_{2,i}$, and $r_{3,i}$) at which each of the slave system nodes 20 ($S_1$, $S_2$, and $S_3$) received the response/blink message 306, the timestamps $T_{j,i}$ ($T_{1,i}$, $T_{2,i}$, and $T_{3,i}$) at which each of the slave system nodes 20 ($S_1$, $S_2$, and $S_3$) received selection/synchronization message 302, and a transmission timestamp $s_{j,i}$ ($s_{1,i}$, $s_{2,i}$, and $s_{3,i}$) at which each of the slave system nodes 20 transmits the respective data message 308. The data message(s) 308 may further include the sequence number seq #. The processor 22 of the master system node 20 (M) is configured to receive the data message(s) 308 at times $S_{M,j,i}$ ($S_{M,1,i}$, $S_{M,2,i}$, and $S_{M,3,i}$), the timestamps of which are recorded by the processor 22.

In one embodiment, each slave system nodes 20 ($S_1$, $S_2$, and $S_3$) is configured to send the respective data message 308 to the master system node 20 (M) at a pre-determined time slot which is $j^{th}$ slot from an expected response time of the target portable device 30. The expected wakeup time of the target portable device 30 is defined by cycle time, which can be fixed or variable, as discussed in further detail below. Based on this value, the expected response time of the target portable device 30 is known as well.

In at least one embodiment, the number m of system nodes 20 in communication range with the target portable device 30 the purposes of the next localization cycle is determined based on how many system nodes 20 received the response/blink message 306, as discussed above. In one embodiment, the data message(s) 308 further includes signal strength information, the CIR metadata, and/or any other metadata which may be used to select the set of n system nodes 20 for a subsequent cycle, as discussed above.

Returning to FIG. 9, the method 200 continues with a step of determining a respective time of flight between the target portable device and each system node in the first set of system nodes (block 240). Particularly, with respect to the embodiments described in detail herein, the processor 22 of the master system node 20 (M) and/or the processor 42 of the body computer module 40 is configured to calculate ToF values using the TWR method for each system node 20 in the selected set of n system nodes 20 that were utilized to conduct a TWR poll and response process. The processor 22 and/or the processor 42 is configured to calculate the ToF for each system node in the selected set of n system nodes 20 according to the equation $ToF_{T,j}=((r_{j,i}-t_{j,i})-(t_{T,i}-r_{T,i}))/2$, where $ToF_{T,j}$ is the time of flight between the target portable device 30 and the respective system node j, $t_{j,i}$ is the time at which the respective system node j transmitted the TWR poll message, $r_{T,i}$ is the time at which the target portable device 30 received the TWR poll message, $t_{T,i}$ is the time at which the target portable device 30 transmitted the response/blink message, and $r_{j,i}$ is the time at which the respective system node j received the response/blink message. It will be appreciated that n ToF values will be calculated corresponding to the TWR processes performed with respect to the selected set of n system nodes 20. For example, in the exemplary $i^{th}$ localization cycle of FIG. 10 in which n=1, just one ToF value will be calculated with respect the slave system node 20 ($S_1$).

With continued reference to FIG. 9, the method 200 continues with a step of determining a respective time difference of arrival between a first system node in the second set of system nodes and each other system node in the second set of system nodes (block 250). Particularly, with respect to the embodiments described in detail herein, the processor 22 of the master system node 20 (M) and/or the processor 42 of the body computer module 40 is configured to calculate a TDoA values using the TDoA method for each of the m system nodes 20 that received the response/blink message from the target portable device 30 (i.e., are in communication range of the target portable device 30). The processor 22 and/or the processor 42 is configured to calculate the TDoA for each of the m system nodes 20 according to the equation $TDoA_{M,j}=(r_{M,j}-r_{j,i}-o_{j,i})$, where $TDoA_{M,j}$ is the TDoA between the master system node M and the system node j, $r_{M,j}$ is the time at which the master system node M received the response/blink message, $r_{j,i}$ is the time at which the system node j received the response/blink message, and $o_{j,i}$ is the clock offset of the system node j.

The processor 22 and/or the processor 42 is configured to calculate the clock offsets $o_{j,i}$ for $i^{th}$ cycle for a slave system node, e.g., $S_1$ is according to the equation $o_{j,i}=(s_{M,j,i}-T_{M,i})-(s_{j,i}-T_{j,i})-2\times ToF_{M,j}$, where $o_{j,i}$ is the clock offset of the system node j, $s_{M,j,i}$ is the time at which the master system node M received the data message from the respective system node j, $s_{j,i}$ is the time at which the respective system node j transmitted the data message to the master system node M, $T_{M,i}$ is the time at which the master system node M transmitted the selection/synchronization message to slave system nodes (or transmitted the TWR poll message in the case that the selection/synchronization message was omitted as in FIG. 11), and $T_{j,i}$ is the time at which the slave system nodes S received the selection/synchronization message to slave system nodes (or received the TWR poll message in the case that the selection/synchronization message was omitted as in FIG. 11). In one embodiment, the results from first cycle are discarded and that slot is used for calibrating the system. After receiving the sync message (i.e., the selection/synchronization message or the TWR poll message in the case that the selection/synchronization message was omitted as in FIG. 11) from the master system node M, all slave system nodes S sync-up their clocks. Slave system nodes S sync-up their clock at every received sync message from the master system node. In cases when slave system nodes S do not receive any message from the master system node M they always used their last value. However, in such cases when sync message is lost, the clock offset is calculated as $o_{j,i}=(s_{M,j,i}-s_{j,i})-ToF_{M,j}$. We note that the locations of the master and slave nodes are static, so $ToF_{M,j}$ should never change. In one embodiment, this value is determined during initial calibration process using TWR between the master system node 20 (M) and each slave system node 20 (S).

We note that, in the event that the master system node M does not receive the response/blink message, the TDoA values can be similarly determined with respect to another of the m system nodes 20 that did receive the response/blink message. Additionally, it will be appreciated that m−1 TDoA values will be calculated for m system nodes 20 that receive the response/blink message. For example, in the exemplary $i^{th}$ localization cycle of FIG. 10, just three TDoA values will be calculated with respect the four system nodes 20 ($S_1$, $S_2$, $S_3$, and M) in communication range of the target portable device 30 (T).

With continued reference to FIG. 9, the method 200 continues with a step of determining a position of the target portable device relative to the vehicle based on the time of flight(s) and time difference of arrival(s). Particularly, the processor 22 and/or the processor 42 is configured to determine a location of the target portable device 30 based on the determined ToF values and the determined TDoA values. It at least one embodiment, the processor 22 and/or the processor 42 is configured to determine the location of the target portable device 30 by empirically solving or finding a common likely solution to several spherical and hyperboloid equations.

With respect to the determined ToF values, the n ToF values yield n spherical equations, each in the form of:

$$d_{j \to T} = c \times \text{ToF}_{T,j}, \text{ and}$$

$$(x_j - x_T)^2 + (y_j - y_T)^2 + (z_j - z_T)^2 = d_{j \to T}^2,$$

where $d_{j \to T}$ is the distance between the system node j and the target portable device 30, the coordinates of the system node j are denoted by $(x_j, y_j, z_j)$, the coordinates of e target portable device 30 are denoted by $(x_T, y_T, z_T)$, and c is the speed of light.

With respect to the determined TDoA values, the m−1 ToF values yield m−1 sets of hyperboloid equations, each in the form of:

$$d_{M \to T} - d_{j \to T} = c \times \text{TDoA}_{M,j},$$

$$d_{j \to T} = \sqrt{(x_j - x_T)^2 + (y_j - y_T)^2 + (z_j - z_T)^2}, \text{ and}$$

$$d_{M \to T} = \sqrt{(x_M - x_T)^2 + (y_M - y_T)^2 + (z_M - z_T)^2},$$

where $d_{j \to T}$ is the distance between the system node j and the target portable device 30, $d_{j \to T}$ is the distance between the master system node M and the target portable device 30, the coordinates of the system nodes j are denoted by $(x_j, y_j, z_j)$, the coordinates of the master system node M are denoted by $(x_M, y_M, z_M)$, the coordinates of the target portable device 30 are denoted by $(x_T, y_T, z_T)$, and c is the speed of light.

In one embodiment, these spherical and hyperboloid equations are solved using a non-linear least squares minimization methods, such as Limited Broyden-Fletcher-Goldfarb-Shanno Bounded (L-BFGS-B), Constrained Optimization by Linear Approximation (COBYLA), Sequential Least Squares Programming (SLSQP), or other similar methods.

It will be appreciated that depending on the values of n and m, different amounts of detail can be determined regarding the position of the target portable device 30 with respect the vehicle 12. Particularly, depending on the values of n and m, 3D localization is enabled, 2D localization is enabled, or merely proximity localization is enabled.

For example, in the case the m>3 and n=1, the localization process will yield one spherical equation and three or more sets of hyperboloid equations, as discussed above. These equations enable 3D localization of the target portable device 30. The processor 22 and/or the processor 42 is configured to solve the equations to determine 3D position (i.e., the coordinates $(x_T, y_T, z_T)$) of the target portable device 30. We note that in this case, the target portable device 30 receives only one TWR poll message and transmits just one response/blink message, thereby achieving improved power efficiency. Additionally, we note that 3D localization is achieved with only four system nodes 20 in communication range of the target portable device 30, which is an improvement compared to the 3D localization requirement of five system nodes for the TDoA process alone.

In the case the m=3 and n=2, the localization process will yield two spherical equations and two sets of hyperboloid equations, as discussed above. These equations also enable 3D localization of the target portable device 30. The processor 22 and/or the processor 42 is configured to solve the equations to determine 3D position (i.e., the coordinates $(x_T, y_T, z_T)$) of the target portable device 30. We note that in this case, the target portable device 30 receives two TWR poll message and transmits just one response/blink message, thereby achieving improved power efficiency, but less than the first case above. Additionally, we note that 3D localization is achieved with only three system nodes 20 in communication range of the target portable device 30, which is an improvement compared the 3D localization requirement of five system nodes for the TDoA process alone and the 3D localization requirement of four system nodes for the TWR process alone.

In the case the m=2 and n=2, the localization process will yield two spherical equations and one set of hyperboloid equations, as discussed above. These equations also enable 2D localization of the target portable device 30. The processor 22 and/or the processor 42 is configured to solve the equations to determine 2D position (e.g., a distance and a direction/angle, or coordinates $(x_T, y_T)$) of the target portable device 30. We note that in this case, the target portable device 30 receives two TWR poll message and transmits just one response/blink message, thereby achieving improved power efficiency, but less than the first case above. Additionally, we note that 2D localization is achieved with only two system nodes 20 in communication range of the target portable device 30, which is an improvement compared the 2D localization requirement of four system nodes for the TDoA process alone and the 2D localization requirement of three system nodes for the TWR process alone.

Finally, in the case the m=1 and n=1, the localization process will yield only a spherical equations and no hyperboloid equations, which are insufficient to enable 3D or 2D localization of the target portable device 30. Nevertheless, the processor 22 and/or the processor 42 is configured to determine a proximity of the target portable device 30 based on the single ToF value. We note that in this case, the target portable device 30 receives only one TWR poll message and transmits just one response/blink message, thereby achieving improved power efficiency.

Even when only proximity of the target portable device 30 is available, vehicular conditions can be used to determine further information. Particularly, given the vehicular state information and a location on vehicle 12 of the one system node 20 in communication with the target portable device 30 one can also estimate whether the device is within the car or outside. Particularly, in one embodiment, the processor 22 and/or the processor 42 is configured to is configured to determine that the target portable device 30 is still outside the vehicle 12 if the target portable device 30 was outside the vehicle 12 before this estimate.

It will be appreciated that these examples above illustrate tradeoffs between complexity, accuracy, and power efficiency at the target portable device 30. Depending on the circumstances, the method 200 advantageously selects the optimal combination of TWR and TDoA process to provide the greatest accuracy with the best power efficiency at the target portable device 30.

Figure 12:
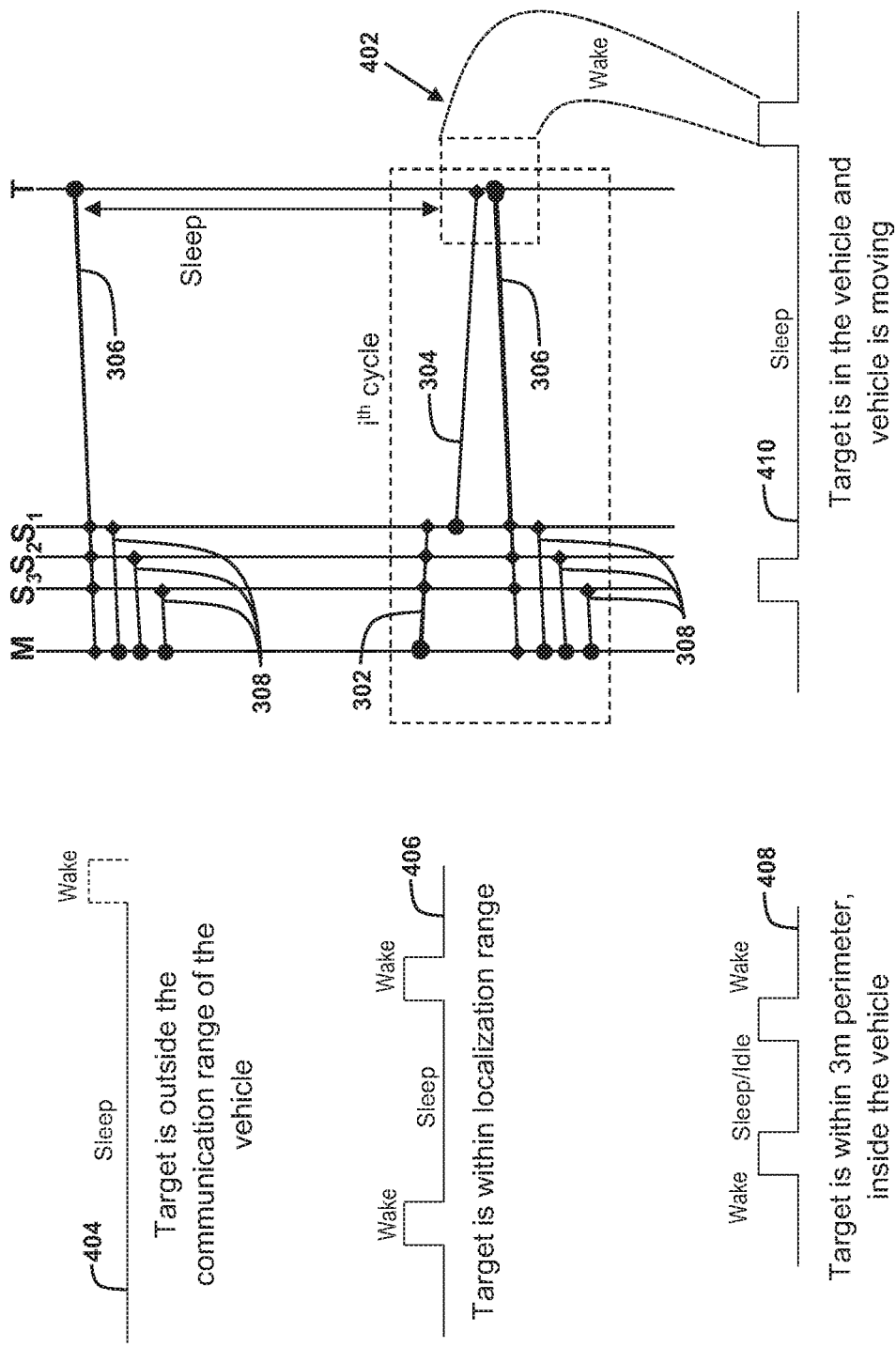
FIG. 12 illustrates adapting a cycle time of the communication protocol of FIG. 10.

In some embodiments, adaptive duty cycling is done to save further energy. Particularly, as shown in FIG. 12, the target portable device 30 and/or the transceiver 36 thereof only needs to wake for during a window 402 that comprises only a portion of the total cycle time of each cycle. During the remainder of each cycle, the target portable device 30 and/or the transceiver 36 thereof can sleep. In some embodiments, the total cycle time is adjusted depending on the circumstances. For example, when the target portable device 30 is out of range the vehicle 12, the transceiver 36 of the target portable device 30 can sleep completely and wakeup only when a motion is detected, at a pre-determined extended wakeup time (or cycle time), or when it is explicitly waken by the processor 32 (see state diagram 404). In one embodiment, the processor 32 is configured to wake the transceiver 36 in response to detecting a predetermined proximity (e.g., within communication range) to the car (e.g., 50 meters). In one embodiment, the processor 32 is configured to detect the predetermined proximity using GPS or using another wireless technology such as Bluetooth Smart. Once the system is within communication range, the communication protocol of the method 200 can be utilized.

In one embodiment, the processor 22 of the master system node 20 (M) and/or the processor 32 of the target portable device 30 is configured to vary the sleep period and/or total cycle time depending on the estimated position of the target portable device 30 and a vehicle state. For example, if the target portable device 30 is within communication range and/or localization range (e.g., 50 meters), a first cycle time may be used (see state diagram 406). If the target portable device is within the vehicle 12 or within a predetermined distance (e.g., 3 meters) of the vehicle, a shorter second cycle time may be used (see state diagram 408). Finally, if the vehicle is moving, a longer third cycle time may be used (see state diagram 410). The processor 22 of the system nodes 20 is configured to inform the target portable device 30 of the cycle time by including it in the TWR poll messages, or any other message. Alternatively, the processor 32 of the target portable device 30 is configured to inform the system nodes 20 of the cycle time by including it in the response/blink message, or any other messages sent to the system nodes 20.

As discussed above, the sync message defines which node(s) will transmit the poll message. In the case that the master node M is the chosen node, then sync and poll messages are combined into single message. In one embodiment, this message also contains cycle time for next poll message for the target device. The target device may use this cycle time parameter or as defined by its constraints chose another one. The target informs the system nodes about its chosen value in the poll response. Thus, all nodes know for how long they need to sleep.

In a case that a message with a new cycle time is lost, the next message from the other device will include the older cycle time. In this way, the device knows when to expect the next messages. Further, the target portable device 30 may have its own limits on cycle time that it cannot go beyond. In such cases the target portable device 30 may ignore cycle time request from the vehicle access system 10 and use its corresponding limit (upper or lower). In all cases, the vehicle access system 10 will use the cycle time set by the target portable device 30 in its most recent message.

In at least one embodiment, messages from the master system node 20 (M) to the slave system nodes 20 (S) and/or messages from the target portable device 30 to the system nodes 20 are transmitted using a common multicast group for all of the system nodes 20. In general, all communication between the devices use a destination address. However, to ensure that messages from master system node 20 (M) or the target portable device 30 are received by all of the slave system nodes 20 (S), it is useful to create a common multicast user group for all of the system nodes 20 in the vehicle (master and slave). In such cases, message directed to more than one system node on the vehicle uses this multicast address.

In one embodiment, during a system calibration phase, the master system node 20 (M) collects addresses of all of the slave system nodes 20 (S) in the vehicle 12 that are part of the vehicle access network. Based on this list, the master system node 20 (M) creates a multicast group ID and informs the slave devices. Further, during a target pairing process, the target portable device 30 is informed of this multicast group ID. It is also possible that the master system node 20 (M) may create a list of multicast group IDs and can provide this whole list (or subset) to the target portable device 30. The target portable device 30 can then randomly chose one of the addresses from this list while communicating with the car. A similar method may be used for generating and address for the target portable device 30 as well. This will provide some protection against eavesdropping and in cases when multiple cars/devices are in the vicinity this will also secure the identity of communicating devices.

In one embodiment, to ensure further protection, this list can also be generated periodically and exchanged with slave system nodes 20 and the target portable device 30. In one embodiment, the group ID is created is using one-way cryptographic hash functions which takes master node ID and all slave node IDs as input and provide a base group ID. It can take a target ID as additional input and generate unique vehicle group ID for each target portable device. In addition, a random node ID can also be used as an input to this function to create a list of possible group IDs (by using different random IDs). The random ID can also be one of the multicast group ID. We note that these computations are done at the master system node 20 (M) and/or the body computer module 40 which then informs the slave system nodes 20 (S) and the paired target portable device 30.

In at least one embodiment, the system 10 is configured to protect itself from a replay attack by comparing channel data of poll and response messages 304 and 306. Particularly, the processor 32 of the target device 30 is configured to record channel data, such as the CIR metadata discussed above, of a poll message 304 received from a system node 20. The processor 32 is configured to include the recorded channel data of the poll message 304 in a response/blink message 306 of the same cycle or subsequent cycle. The system node 20, which sent poll message 304, is configured to receive the response/blink message 306 having the recorded channel data of the poll message 304 from the target device 30 and record channel data of the response/blink message 306 itself. The system node 20 is configured to provide the recorded channel data of the poll message 304 and the response/blink message 306. The system node 20 is configured to provide the recorded channel data to the master node M in the data message 308.

The processor 22 and/or the processor 42 is configured to determine a correlation between the recorded channel data of the poll message 304 and the recorded channel data of the response/blink message 306. If the correlation between the channel data sensed of the poll message 304 and the response/blink message 306 is greater than a predetermined threshold, then the processor 22 and/or the processor 42 determines that there is no security risk. However, if the correlation is less than the predetermined threshold, then the processor 22 and/or the processor 42 determines that there is possibility of replay attack. In response to the correlation being less than the predetermined threshold for more than a predetermined number of cycles (e.g., three or more cycles), processor 22 and/or the processor 42 is configured to disable the vehicle access system 10. The vehicle access system 10 is re-enabled after successful access using a physical key or remote keyless entry (RKE) feature.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method of operating a vehicle access system having a plurality of system nodes arranged throughout a vehicle, the method comprising:
selecting a first set of system nodes in the plurality of system nodes, the first set of system nodes being a subset of the plurality of system nodes;
transmitting, with each system node in the first set of system nodes, a respective poll message to a target portable device and recording, with each system node in the first set of system nodes, a first timestamp at which the respective poll message is transmitted;
receiving a response message from the target portable device with a second set of system nodes in the plurality of system nodes and recording, with each system node in the second set of system nodes, a respective second timestamp at which the response message is received, the response message including one of (i) a respective third timestamp at which each respective poll message was received at the target portable device and a fourth timestamp at which the response message was transmitted and (ii) a respective wait time equal to a difference between the respective third timestamp and the fourth timestamp;
determining a respective time of flight between the target portable device and each system node in the first set of system nodes based on the respective first timestamp, the respective second timestamp, and the one of (i) the respective third timestamp and the fourth timestamp and (ii) the respective wait time;
determining a respective time difference of arrival between a first system node in the second set of system nodes and each other system node in the second set of system nodes based on the respective second timestamp recorded by the first system node in the second set of system nodes and the respective second timestamp recorded by each other system node in the second set of system nodes; and
determining a position of the target portable device relative to the vehicle based on (i) the respective time of flight between the target portable device and each system node in the first set of system nodes and (ii) the respective time difference of arrival between the first system node in the second set of system nodes and each other system node in the second set of system nodes.

2. The method of claim 1, the selecting of the first set of system nodes further comprising:
selecting the first set of system nodes depending on a number of system nodes in the plurality of system nodes that are in communication range of the target portable device, the first set of system nodes being selected from the system nodes in the plurality of system nodes that are in communication range of the target portable device.

3. The method of claim 2, the selecting of the first set of system nodes further comprising:
selecting a master node of the plurality of system nodes as one of the first set of system nodes in response to the master node being in communication range of the target portable device.

4. The method of claim 2, the selecting of the first set of system nodes further comprising:
selecting only one system node as the first set of system nodes in response to more than three system nodes in the plurality of system nodes being in communication range of the target portable device; and
selecting only one system node as the first set of system nodes in response to only one system node in the plurality of system nodes being in communication range of the target portable device.

5. The method of claim 2, the selecting of the first set of system nodes further comprising:
selecting only two system nodes as the first set of system nodes in response to only three system nodes in the plurality of system nodes being in communication range of the target portable device; and
selecting only two system nodes as the first set of system nodes in response to only two system nodes in the plurality of system nodes being in communication range of the target portable device.

6. The method of claim 2, the selecting of the first set of system nodes further comprising:
determining the number of system nodes in the plurality of system nodes that are in communication range of the target portable device based on which system nodes in the plurality of system nodes received a previous message from the target portable device during a previous communication cycle.

7. The method of claim 1, the selecting of the first set of system nodes further comprising:
selecting the first set of system nodes depending on at least one of (i) locations of the plurality of system nodes on the vehicle, (ii) signal strengths of messages received at the plurality of system nodes from the target portable device, and (iii) channel state information metadata for messages received at the plurality of system nodes from the target portable device.

8. The method of claim 1 further comprising:
transmitting a respective data message from each slave system node of the plurality of system nodes to a master system node of the plurality of system nodes, each respective data message including a fifth timestamp at which the respective data message is transmitted;
recording, with the master system node, respective sixth timestamps at which each respective data message is received by the master system node; and
calculating a clock offset of each of the slave system nodes with respect to the master system node based on the fifth timestamp and the respective sixth timestamps.

9. The method of claim 8, wherein each respective data message further includes metadata with respect to at least one of (i) a signal strength of messages received at the respective slave system node from the target portable device and (ii) channel state information for messages received at the respective slave system node from the target portable device.

10. The method of claim 8 further comprising:
transmitting a synchronization message from the master system node to each of the slave system nodes, the synchronization message including a seventh timestamp at which the synchronization message is transmitted;
recording, with each of the slave system nodes, respective eighth timestamps at which the synchronization message is received by the respective slave system nodes; and
calculating the clock offset of each of the slave system nodes with respect to the master system node further based on based on the seventh timestamp and the respective eighth timestamps.

11. The method of claim 1, the determining of the position of the target portable device relative to the vehicle further comprising:
determining a three-dimensional position of the target portable device in response to the second set of system nodes that received the response message from the target portable device including at least three system nodes.

12. The method of claim 1, the determining of the position of the target portable device relative to the vehicle further comprising:
determining a two-dimensional position of the target portable device in response to (i) the selected first set of system nodes including only two system nodes and (ii) the second set of system nodes that received the response message from the target portable device including only two system nodes.

13. The method of claim 1, the determining of the position of the target portable device relative to the vehicle further comprising:
determining proximity of the target portable device in response to (i) the selected first set of system nodes including only one system node and (ii) the second set of system nodes that received the response message from the target portable device including only one system node.

14. The method of claim 1 further comprising:
adjusting a communication cycle time between the plurality of system nodes and the target portable device depending on the determined position of the target portable device.

15. The method of claim 1 further comprising:
unlocking doors of the vehicle in response to the target portable device being within a predetermined range of the vehicle based on the determined position of the target portable device.

16. The method of claim 1 further comprising:
preventing an engine of the vehicle from being started unless the target portable device is inside the vehicle based on the determined position of the target portable device.

17. The method of claim 1 further comprising:
generating a multicast group identifier at least based on individual identifiers of each system node in the plurality of system nodes; and
using the multicast group identifier for communications between the plurality of system nodes and the target portable device.

18. The method of claim 1 further comprising:
receiving, as a part of the response message, channel data of the respective poll message transmitted by a first system node in first set of system nodes;
recording channel data of the response message with the first system node;
determining a correlation between the channel data of the respective poll message and the channel data of the response message; and
disabling the vehicle access system in response to the correlation being less than a predetermined threshold for a predetermined number of consecutive cycles.

19. A vehicle access system comprising:
a plurality of system nodes arranged throughout a vehicle, each system node in the plurality of system nodes including a transceiver configured to communicate with a target portable device, the plurality of system nodes including a master system node and each other system node in the plurality of system nodes being a slave system node; and
a vehicle computer operably connected to the master system node,
wherein one of the master system node and the vehicle computer is configured to select a first set of system nodes in the plurality of system nodes, the first set of system nodes being a subset of the plurality of system nodes,
wherein each system node in the plurality of system nodes is configured to, in response to being selected as one of the first set of system nodes, transmit a respective poll message to the target portable device and record a first timestamp at which the respective poll message is transmitted,
wherein a second set of system nodes in the plurality of system nodes that are in communication range of the target portable device are configured to receive a response message from the target portable device and record a respective second timestamp at which the response message is received, the response message including one of (i) a respective third timestamp at which each respective poll message was received at the target portable device and a fourth timestamp at which the response message was transmitted and (ii) a respective wait time equal to a difference between the respective third timestamp and the fourth timestamp,
wherein one of the master system node and the vehicle computer is configured to:
determine a respective time of flight between the target portable device and each system node in the first set of system nodes based on the respective first timestamp, the respective second timestamp, and the one of (i) the respective third timestamp and the fourth timestamp and (ii) the respective wait time;
determine a respective time difference of arrival between a first system node in the second set of system nodes and each other system node in the second set of system nodes based on the respective second timestamp recorded by the first system node in the second set of system nodes and the respective second timestamp recorded by each other system node in the second set of system nodes; and
determine a position of the target portable device relative to the vehicle based on (i) the respective time of flight between the target portable device and each system node in the first set of system nodes and (ii) the respective time difference of arrival between the first system node in the second set of system nodes and each other system node in the second set of system nodes.

20. The vehicle access system of claim 19, wherein the vehicle computer is configured to:
unlock doors of the vehicle in response to the target portable device being within a predetermined range of the vehicle based on the determined position of the target portable device; and
prevent an engine of the vehicle from being started unless the target portable device is inside the vehicle based on the determined position of the target portable device.

* * * * *